United States Patent
Oura

Patent Number: 6,128,416
Date of Patent: *Oct. 3, 2000

[54] IMAGE COMPOSING TECHNIQUE FOR OPTIMALLY COMPOSING A SINGLE IMAGE FROM A PLURALITY OF DIGITAL IMAGES

[75] Inventor: Koutatsu Oura, Tokyo, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/796,619

[22] Filed: Feb. 7, 1997

Related U.S. Application Data

[63] Continuation-in-part of application No. 08/301,240, Sep. 6, 1994, abandoned.

[30] Foreign Application Priority Data

Sep. 10, 1993 [JP] Japan ................................ 5-226154

[51] Int. Cl.[7] ................................ G06K 9/36
[52] U.S. Cl. ................ 382/284; 348/239; 358/450; 358/540; 382/294
[58] Field of Search ................ 382/151, 163, 382/209, 215, 216, 217, 218, 221, 222, 268, 278, 282, 283, 284, 293, 294, 295, 154; 348/36, 218, 699, 239; 345/435; 358/450, 540

[56] References Cited

U.S. PATENT DOCUMENTS

| | | | |
|---|---|---|---|
| 3,254,156 | 5/1966 | Kegelman | 348/36 |
| 3,905,045 | 9/1975 | Nickel | 382/130 |
| 4,272,756 | 6/1981 | Kakumoto et al. | 382/284 |
| 4,468,688 | 8/1984 | Gabriel et al. | 348/580 |
| 4,825,393 | 4/1989 | Nishiya et al. | 364/560 |
| 4,895,431 | 1/1990 | Tsujiuchi et al. | 382/128 |
| 5,036,545 | 7/1991 | Iida et al. | 382/284 |
| 5,047,853 | 9/1991 | Hoffert et al. | 348/396 |
| 5,138,460 | 8/1992 | Egawa | 348/239 |
| 5,353,391 | 10/1994 | Cohen et al. | 395/125 |
| 5,394,520 | 2/1995 | Hall | 395/135 |
| 5,455,689 | 10/1995 | Taylor et al. | 358/450 |
| 5,465,163 | 11/1995 | Yoshihara et al. | 358/444 |
| 5,475,428 | 12/1995 | Hintz et al. | 348/263 |
| 5,548,326 | 8/1996 | Michael | 382/151 |
| 5,557,543 | 9/1996 | Parsons | 364/516 |
| 5,598,482 | 1/1997 | Balasubraminian et al. | 382/163 |
| 5,602,584 | 2/1997 | Mitsutake et al. | 382/154 |
| 5,604,546 | 2/1997 | Iwata | 348/699 |
| 5,653,234 | 8/1997 | Kim et al. | 128/660.01 |

FOREIGN PATENT DOCUMENTS

| | | | | |
|---|---|---|---|---|
| 63-64180 | 3/1988 | Japan | | G06F 15/66 |
| 3-182976 | 8/1991 | Japan | | G06F 15/66 |
| 6-141246 | 5/1994 | Japan | | H04N 5/355 |

*Primary Examiner*—Amelia Au
*Assistant Examiner*—Timothy M. Johnson
*Attorney, Agent, or Firm*—Frishauf, Holtz, Goodman, Langer & Chick, P.C.

[57] ABSTRACT

The present invention discloses an image composing apparatus comprising a reference block setting circuit for setting a search area having a stored arbitrary size in an overlap region of composed image data which has been picked up, for setting a first reference block at a suitable position in the area, depending on determination as to correlation performed by an optimal average density calculation circuit, for extracting a reference point, for extending a search line from the reference point toward a lower portion, for setting a second reference block at a position on the search line, which has correlation, for extracting a reference point, and for obtaining reference points, a displacement amount detection circuit for obtaining displacement amounts R and S from the reference points, an interpolation circuit for interpolating images, and a composing circuit for performing image composing.

11 Claims, 21 Drawing Sheets

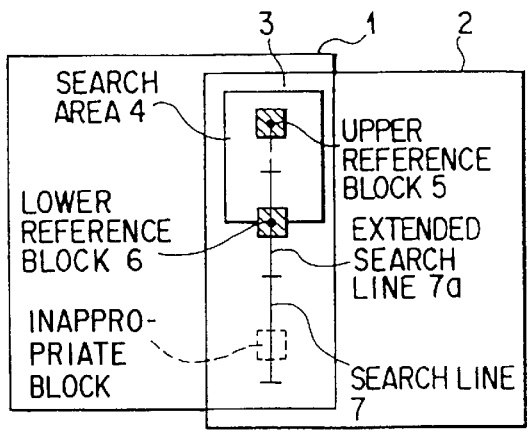
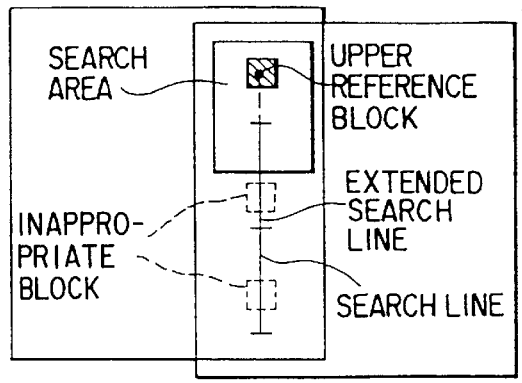
F I G. 8A   F I G. 8B
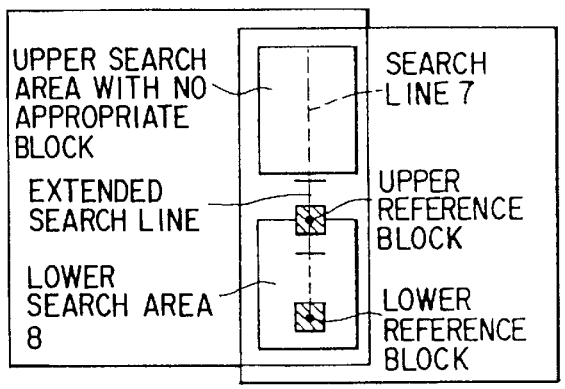
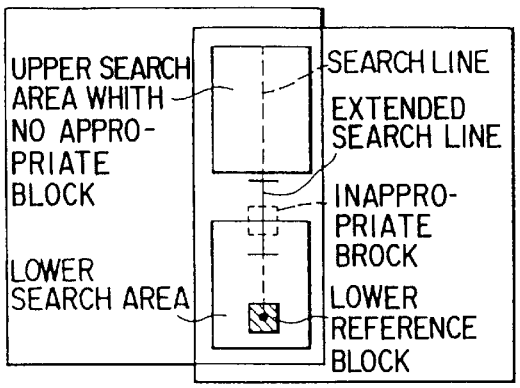
F I G. 8C   F I G. 8D
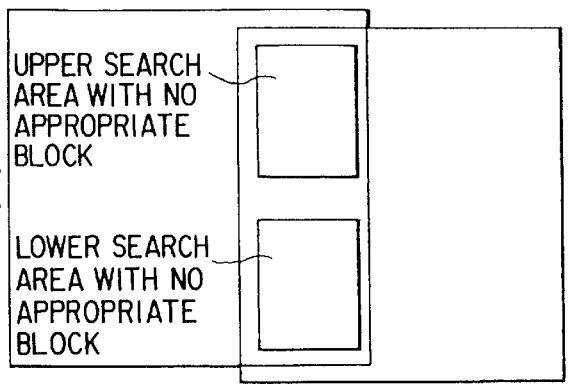
F I G. 8E

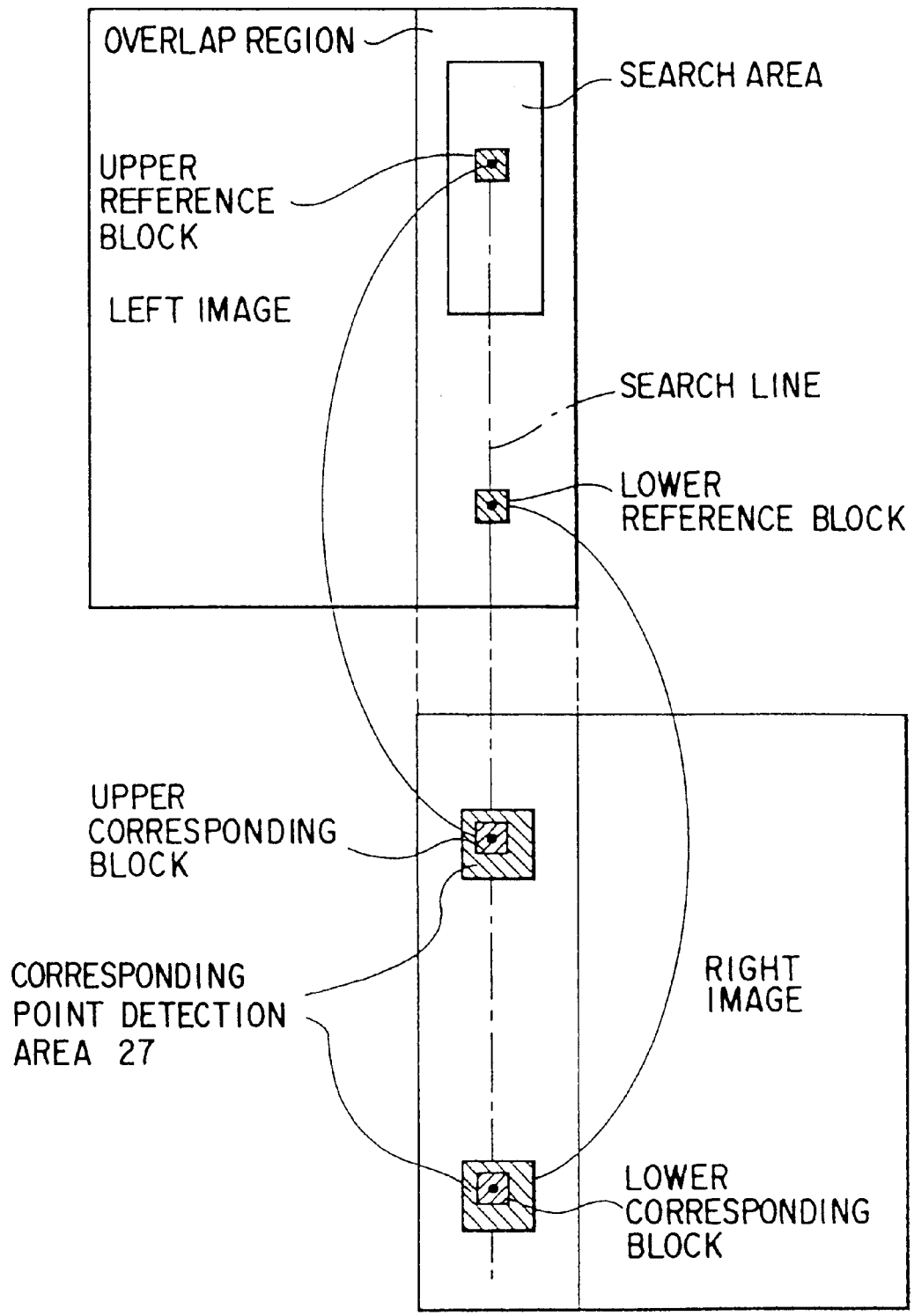
F I G. 14

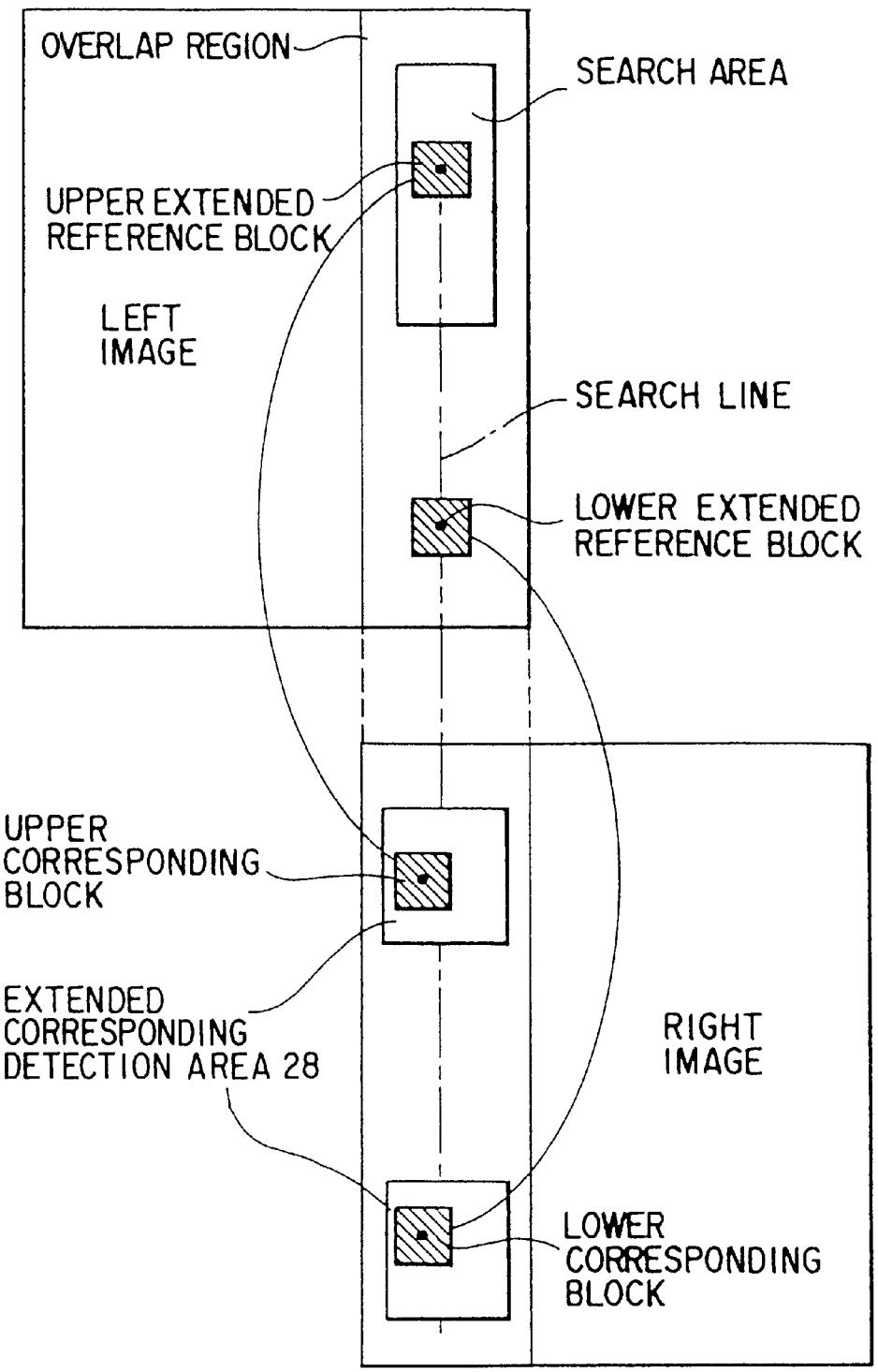
F I G. 16

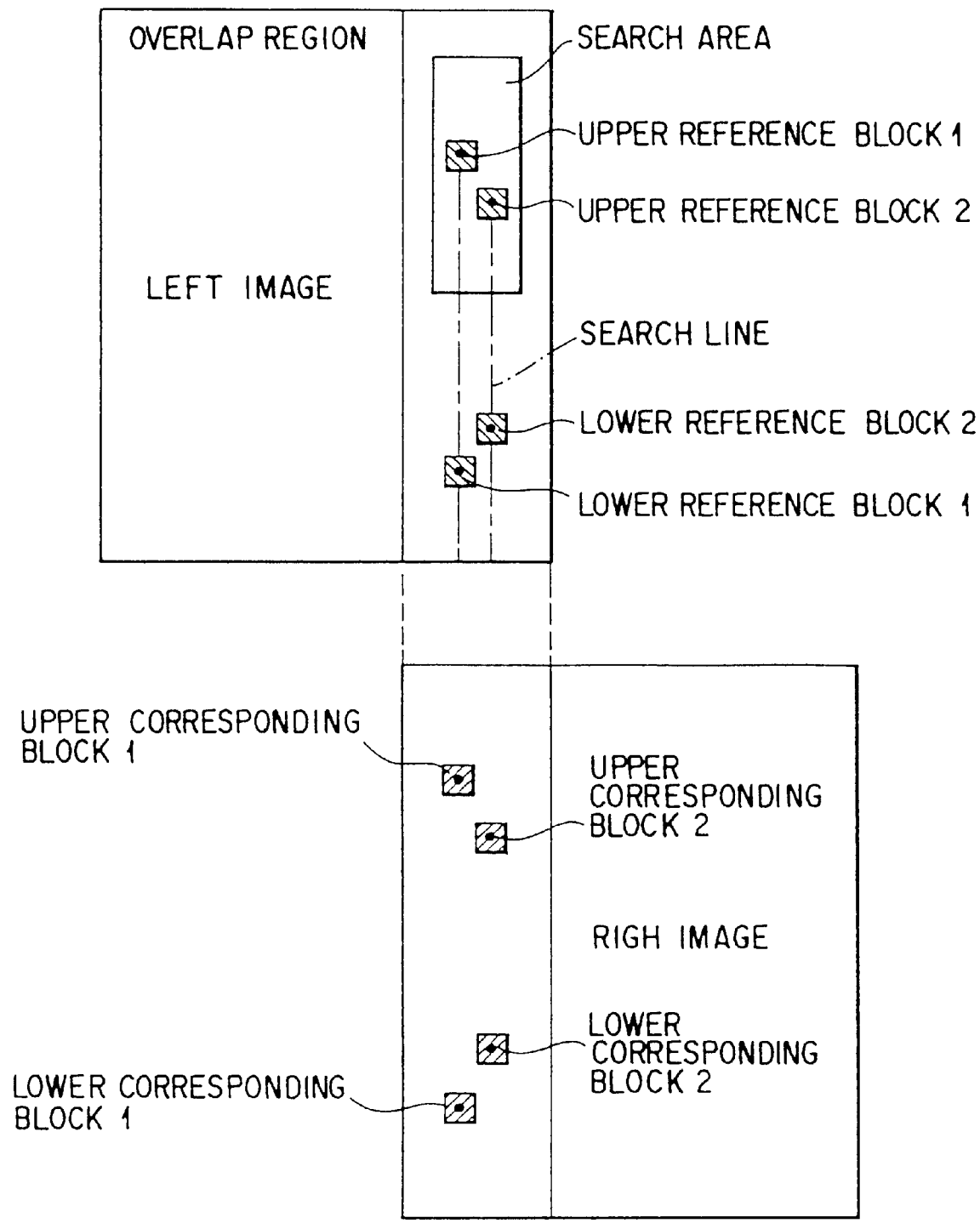
F I G. 17

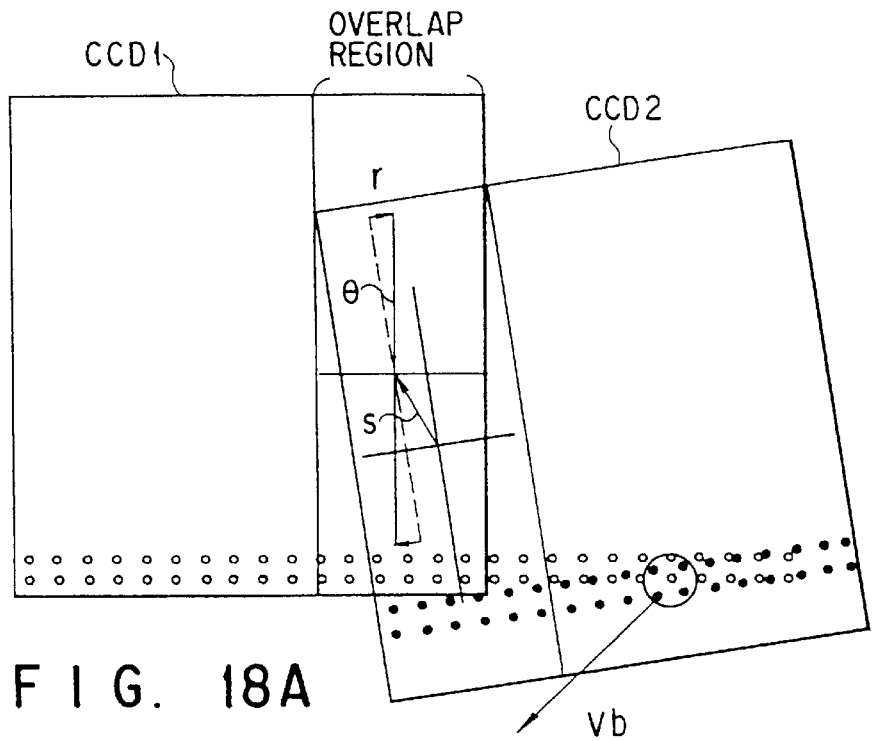
F I G. 18A
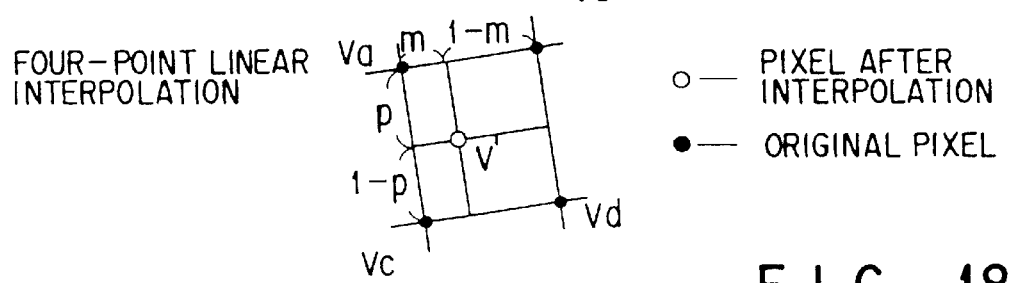
F I G. 18B
$V' = (1-m)(1-p)Va + m(1-p)Vb + (1-m)pVc + mpVd$

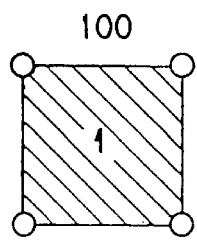
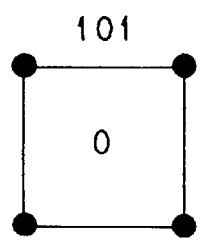
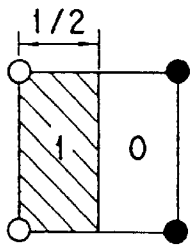
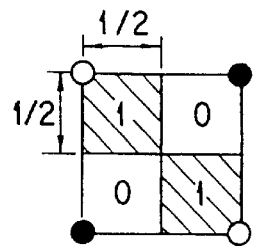
FIG. 21A    FIG. 21B    FIG. 21C    FIG. 21D
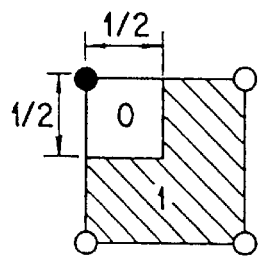
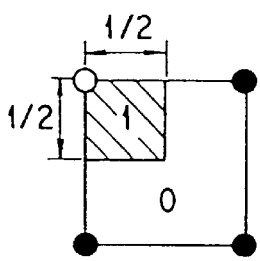
FIG. 21E    FIG. 21F
● — PIXEL OF 0
○ — PIXEL OF 1
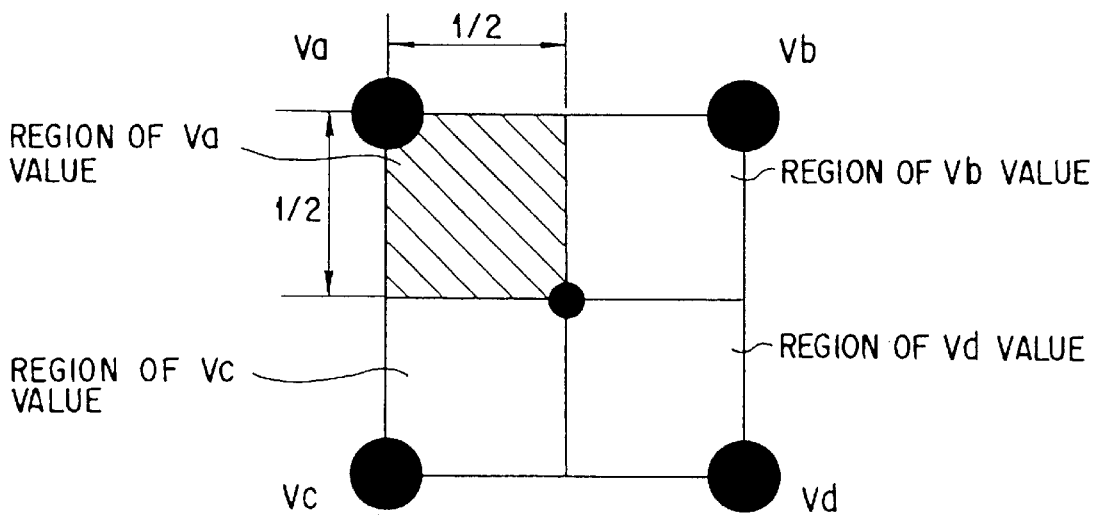
FIG. 22

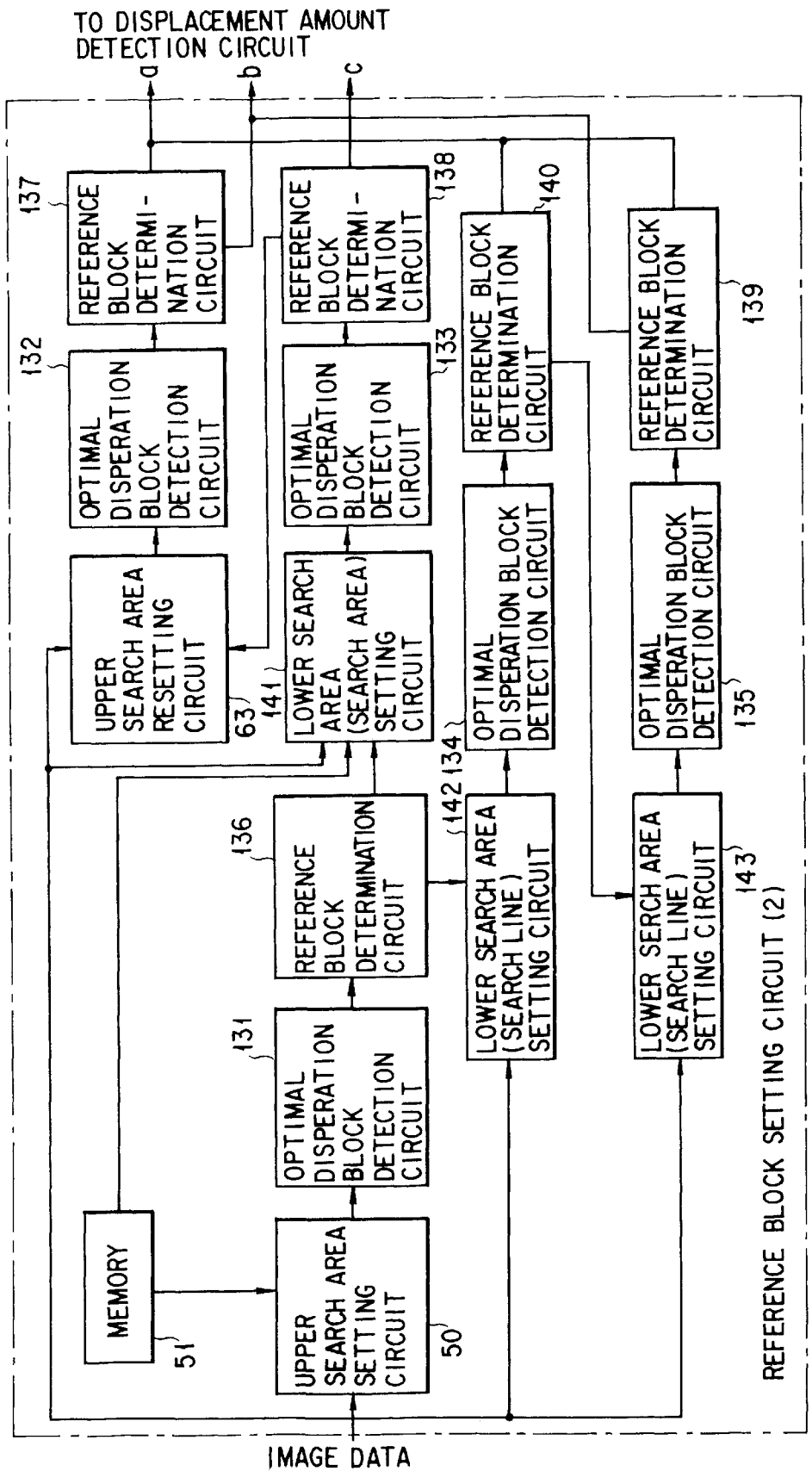

IMAGE COMPOSING TECHNIQUE FOR OPTIMALLY COMPOSING A SINGLE IMAGE FROM A PLURALITY OF DIGITAL IMAGES

CROSS-REFERENCE TO RELATED APPLICATIONS

This application is a continuation-in-part of U.S. patent application Ser. No. 08/301,240, filed Sep. 6, 1994, now abandoned the entire contents of which are incorporated herein by reference.

BACKGROUND OF THE INVENTION

The present invention relates to an image composing apparatus for connecting a plurality of digital images in which overlap regions of respective end portions of digital images are optimally composed with each other so that one single composition is divided into a plurality of digital images in order to match these digital images with each other, thereby reconstructing a source composition with the matched image.

In general, when one signal composition is divided into a plurality of digital images (binarized image data) for reconstruction of the source composition, portions (end portions) of one digital image and of another digital image to be composed are overlapped on each other, thereby forming an overlap portion (overlap region).

Normally, a dislocation occurs between positions of pixels of an image to compose and positions of pixels of another image to be composed, within the overlap region, and therefore, the positions, densities, and the likes are corrected so that the two images are smoothly connected with each other as a composed continuous image.

For example, Jpn. Pat. Appln. KOKAI Publication No. 63-64180 discloses a method, that is, a matching method, in which, when a large size image is inputted as one single image with use of a hand-scanner, the large size image is divided into a plurality of blocks in order to input the picked-up image since the range of an image which can be picked up by a hand-scanner is limited to a certain area. When such a large size image is reproduced, divided images are superimposed and matched with each other, for all scans, thereby to reproduce the large size image.

In addition, Jpn. Pat. Appln. KOKAI Publication 3-182976 discloses a composing method in which images are converted and binarized such that densities of images to be composed with each other are uniform, and a particular center of particles is obtained for each image, thereby to attain matching of images.

However, in the above publications, a plurality of images are composed with each other by defining an area of a certain range within an overlap region, as a reference block, and on the basis of the reference block, various correction is carried out to compose a plurality of images.

Specifically, there are two conventional methods for defining a reference block, i.e., a method in which a reference block is fixed to a position of a certain area within an image, and another method in which the reference block is manually specified to an arbitrary position of a certain area within an image by an operator. The above-mentioned publication No. 63-64180 discloses a mask pattern in which the block is fixed as in the former method, while the publication No. 3-182976 describes a method like the latter one in which two reference positions are arbitrarily determined by specifying the numbers of pixels of portions expressed in form of particles on an image.

In case where an image compose apparatus is mounted on a camera or the like and is used for purpose of picking up images from presented documents or a block-board used during a meeting, images projected by an over-head projector, or books, there may be a situation that images photographed by the camera must be quickly reproduced, depending on contents of images. Such quick reproduction of images, however, requires high-speed processing, and detection of a reference block and processing for extracting a corresponding point needs to be automatically carried out on the spot after image pick-up operations.

Further, in case of setting a reference block at a fixed position, thereby may be situations that an average density in a reference block is very high (e.g., the number of white pixels is much greater than the number of black pixels, or the reference block is completely white, in case of using binarized images) and the average density in a reference block is very low, since data of images which must be picked up varies. If corresponding points are extracted on the basis of such a reference block, matching cannot be accurately performed.

As described in Jpn. Pat. Appln. Publication No. 63-64180, corresponding points on overlap regions of two images to be composed with each other are extracted such that the points are positioned within a predetermined reference block, and therefore, a large dislocation between images can be smoothly interpolated by setting a larger reference block. However, in this case, processing always requires a long time period.

Therefore, a reference block having a fixed size cannot always have a range from which corresponding points can be properly extracted and which have an effective size.

The method described in Jpn. Pat. Appln. KOKAI Publication No. 3-182976 can be practically adopted to obtain crystal photographs used for investigating a particular metal composition having characterizing particles, but is not designed so as to be applicable for general purpose. Further, since such photographs need not be reproduced after photographing, consideration is not taken into as to measures for shortening a time period required for processing or for achieving high-speed processing. Therefore, high-speed processing cannot be achieved in this method.

BRIEF SUMMARY OF THE INVENTION

Therefore, the object of the present invention is to provide an image composing apparatus in which displacement amounts between pixels of respective images are obtained and interpolated on the basis of a reference block defined as an optimal average density, within a search area and a search line having arbitrary variable sizes provided in a region where images overlap on each other, and image composing is thus achieved at a high speed.

In order to achieve the above object, the image composing apparatus comprises: reference block setting means for setting a first search area within an overlap region where image data items are overlapped for a predetermined width, for setting a first reference block having a predetermined size considered appropriate on the basis of an average density or a dispersion value determined from a density of the image data items within the first search area, and for setting a second reference block at a position considered appropriate on the basis of the average density or dispersion value within a second search area extended from the first reference block in a lengthwise direction of the overlap region; interpolation amount detection means for detecting an interpolation amount to a position of a pixel to be interpolated when the image data items are composed, from a predetermined pixel in each of the reference blocks set by the reference block setting means; interpolation means for interpolating images to be composed with each other on the basis of the displacement amount detected by the displacement detection means; and image composing means for composing the image data item with the image data item interpolated by the interpolation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A to 8E are views for showing positional relationships between a search area and a reference block within an overlapped region with respect to images composed with other by an image composing apparatus according to the second embodiment;

FIG. 14 is a figure showing a positional relationship between a reference block and a search area which is defined to be relatively small, in the fourth embodiment;

FIG. 16 is a view showing a positional relationship between a reference block and a search area in which a template block is set as a magnified image, in the fourth embodiment;

FIG. 17 is a view showing a positional relationship between reference blocks and a search area where a plurality of reference blocks are used to perform matching processing;

FIGS. 18A and 18B are views for explaining conventional linear interpolation;

FIGS. 21A to 21F are views showing pixel values of pixels to be interpolated which are positioned in the region divided into four pixel areas;

FIG. 22 is a view showing a divided condition of a region surrounded by four pixels;

FIG. 30 is a block diagram illustrating in detail the reference block setting circuit shown in FIG. 28.

DETAILED DESCRIPTION OF THE INVENTION

In the following, embodiments of the present invention will be specifically explained with reference to the drawings.

Binarized image composing with use of an image composing apparatus according to the present invention will be first explained with reference to FIG. 1.

The image composing apparatus is an apparatus in which one signal composition is divided into a plurality of image data and picked up, the picked-up images are connected with each other for reconstructing the source composition, wherein the image to compose is connected with the image to be composed (a reference image) so that the source composition is reconstructed with the images. These images have been formed such that common subjects are included in respective end portions of the images in order to determine the common subjects as marks for overlapping, and the positions of the marks are obtained by correlation described below so that the images are automatically composed in accordance with the marks. Especially, the positions of all the pixels of the image to compose are matched with the positions of the pixels of the reference image in order to move the image, but the subject image of the image to compose is maintained.

In the image composing apparatus, respective portions of two composed and composing images (the reference image and the image to compose) are overlapped on each other, a movable search area of an arbitrary size is determined within the overlap region of the reference image, and a reference block is set at a position having a large dispersion value and corresponding to the image data, within this search area.

A first reference block is set at first within the overlap region of the reference image, and a second reference block is set at a position having a certain spatial relationship with correlation with the first reference block.

In the image composing apparatus, processing for detecting a position having high correlation with the first and second reference blocks, that is, a position having the same subject image within the overlap region of the image to compose as a corresponding point of the image to compose is performed, and processing for interpolating the image to compose in accordance with a calculated displacement amount for obtaining a displacement between the reference image and the composing image, thereby connecting the composing image with the reference image as one composed continuous image is performed. These processing operations are rapidly carried out without necessitating operation by a user.

The sizes of the reference block and the overlap region which are used as references are arbitrarily set and stored by a user, depending on the sizes of images and conditions of overlapped images. In this embodiment, it is assumed that a reference block is approximately set to a size of 17×17 pixels, and an overlap region is set to be 15 to 20% (e.g., 100 to 130 pixels in the lateral direction) of an area of an image (e.g., 638×500 pixels).

Figure 1:
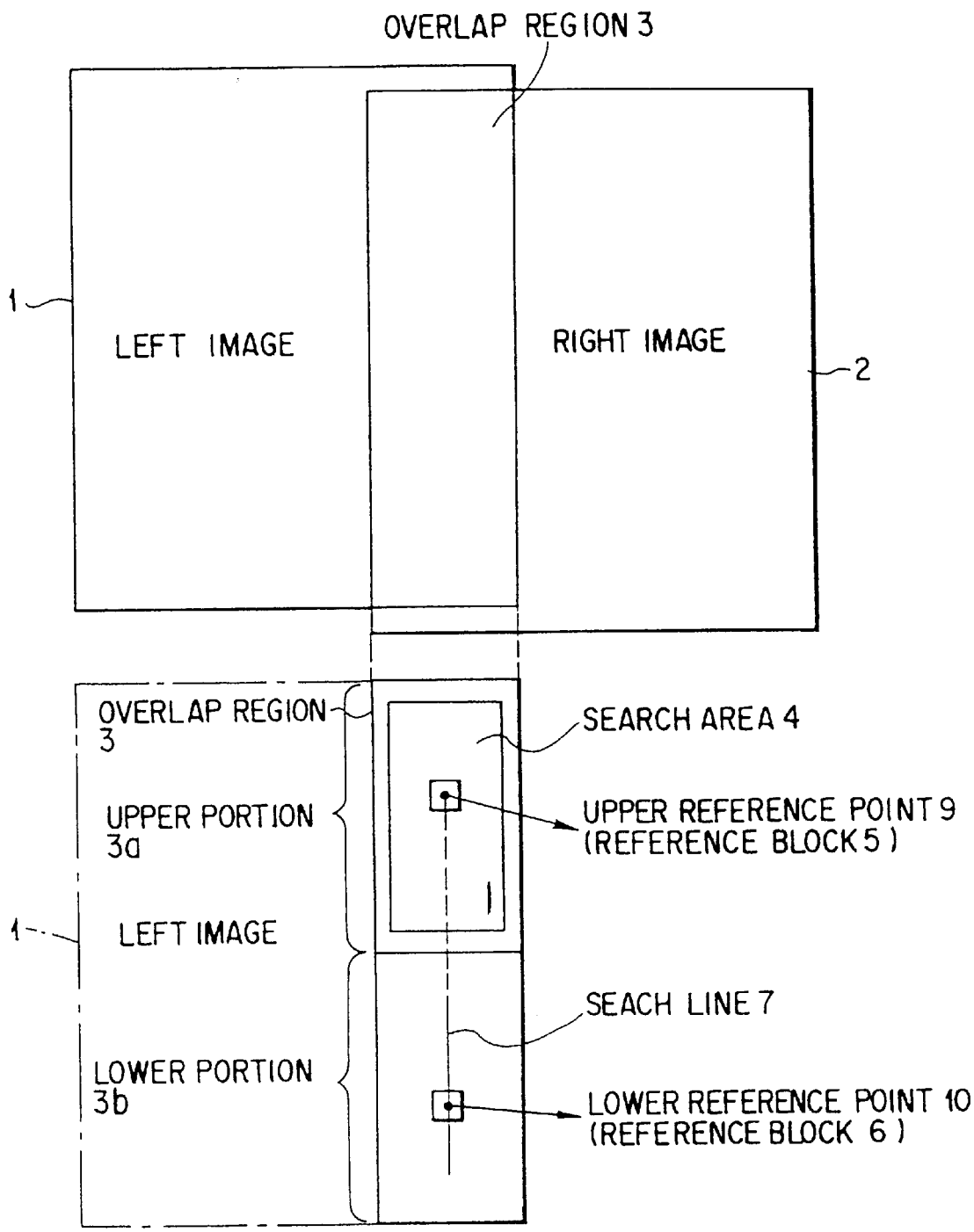
FIG. 1 is a view schematically showing image composing processing according to an image composing apparatus of the present invention.

FIG. 1 shows an example in which two images are composed into one image. The left-hand image 1 is a primary image (i.e., reference image), and the right-hand image 2 is a secondary image (i.e., image to compose) to be composed with the primary image 1. The region where these two images are overlapped on each other is denoted as an overlap region 3.

A search area 4 having an arbitrary size is provided in the overlap region 3 of the reference image 1. Determination of an average density, which will be described later, is performed in the area, and a reference block 5 is set at a proper position. A line (or search line) 7 is extended from the center point of the reference block 5 thus set toward a lower portion 3b, and an average density is determined to see whether or not a reference block 6 can be set on the search line 7. The reference block 6 is detected by performing a search only on the search line 7. This reduces the amount of calculations necessary for searching operations.

Since the area on the search area 4 and the search line 7, on which a reference block is provided, can be expressed as data of a binary image, an average density of each block is checked for every pixel by the following processing, and the area is set as a reference block in the position which satisfy the following formula (1).

$$V0 = Min|C0 - C/2| \text{ or}$$
$$V1 = Min|C1 - C/2| \quad (1)$$

Note that C0 is the number of pixels existing in a block 0, C1 is the number of pixels existing in a block 1, and the number of total pixels existing in the blocks is (C0+C1).

Meanwhile, the average density of the area within the overlap region 3, where the search area 4 and the reference block on the search line 7 are provided, differs, depending on photographed images. The average density may be extremely high or low, and in such cases, composing of image is failed at a high possibility or mismatching occurs at a high possibility. In order to solve this problem, the average density of a reference block is estimated by the following formula (2) (which will be hereinafter referred to as of an average density determination).

$$|V0 - C/2| < P \cdot C/2 \text{ or}$$
$$|V1 - C/2| < P \cdot C/2 \quad (2)$$

Note that the range of p is defined as 0<p<20% from experience. If the requirements of the formula (2) are satisfied, the dispersion value can be considered to be not sufficient. This range defines the optimal value of p obtained as a result of experimental tests.

Figure 2:
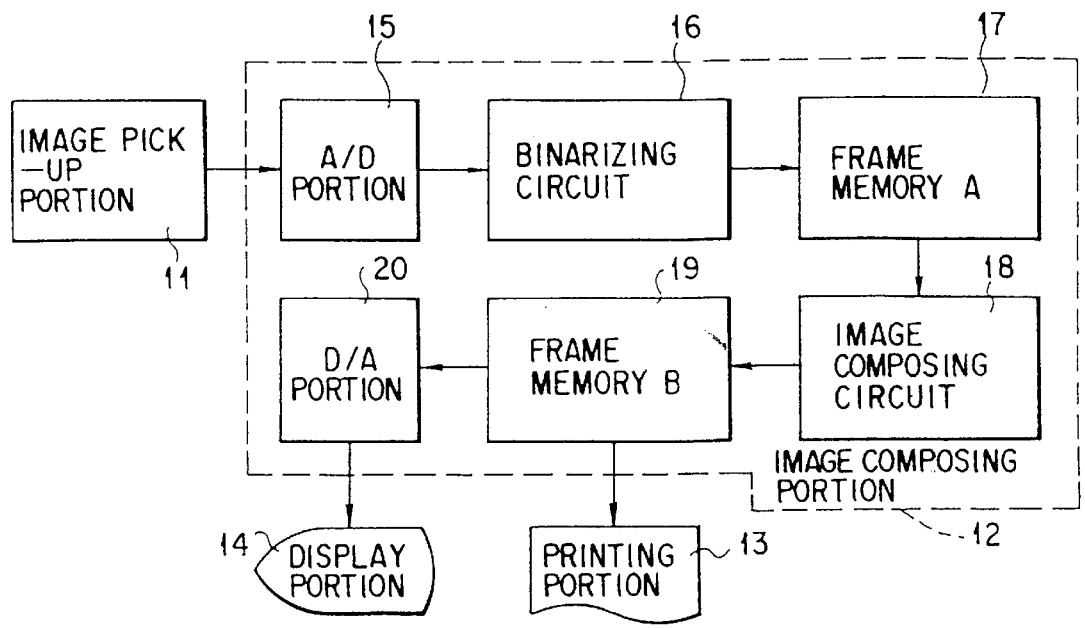
FIG. 2 is a block diagram showing an example of configuration in which an image composing apparatus is mounted on an electron camera or the like for outputting a binarized image, as a first embodiment.

FIG. 2 shows an example of configuration in which the image composing apparatus stated above is mounted in an electron camera or the like for outputting a binary image, according to the first embodiment.

This configuration is constituted by an image pick-up portion 11, an image composing portion 12, a printer portion 13, and a display portion 14. This image pick-up portion 11 utilizes a CCD as described in U.S. Ser. No. 08/045,038, and adopts a structure in which a mirror facing in a forward direction is rotated to obtain an image oriented in a different direction or a structure in which a TV camera is rotated to obtain continuous image signals.

Image signals photographed by the image pick-up portion 11 are digitalized by an A/D portion 15 of an image composing portion 12 and are subjected to binarizing processing through a binarizing circuit 16. This binarizing processing is carried out, for example, by using a high-speed binarizing method described in U.S. Ser. No. 08/125,602 proposed by the present inventors. The binarizing processing is performed on an image immediately after having photographed an image in view of advantages in that binarizing processing must be performed at any rate in order to finally output a binary image and in that processing to be performed later for detecting a reference block and a corresponding point with respect to a binary image can be performed at a high speed.

An image data item outputted from this binarizing circuit 16 is temporarily stored into a memory, for example, a frame memory A17. Then, image data items for predetermined frames are read out from the frame memory A17 and are subjected to composing processing as will be described below by an image composing circuit 18. The image (composed image) obtained by the composing processing is stored into a memory, for example, a frame memory B19. The memories used in the present embodiment are frame memories. Nonetheless, the data need not be stored in units of frames, and the frame memories can be replaced by memories of any other type which can store image data.

The composed image thus stored into the frame memory B19 is read out and is then printed out by a printing portion 9 or is analogue-converted by a D/A converting portion 20 and is displayed on a display portion such as a cathode ray tube or the like.

Figure 3:
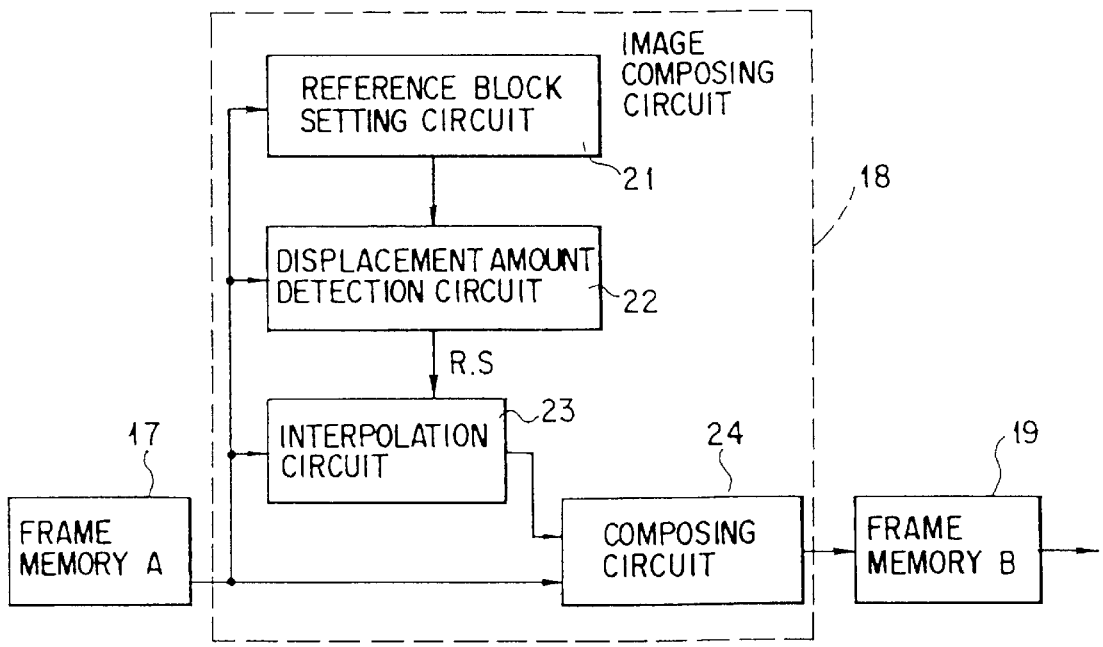
FIG. 3 is a block diagram showing a practical example of configuration of an image composing circuit shown in FIG. 2.

FIG. 3 shows a practical example of configuration of an image composing circuit shown in FIG. 2.

This image composing circuit 18 comprises a reference block setting circuit 21 for setting a reference block on the basis of image data read out from the frame memory A17, a displacement amount detection circuit 22 for detecting a displacement amount of a corresponding point on the basis of a reference block thus set and the image data thus read out, an interpolation circuit 23 for interpolating an image to compose, on the basis of the displacement amount thus detected, and a composing circuit 24 for composing a reference image read from the frame memory A17, with an image to compose, which is thus interpolated.

In addition, the displacement amount detection circuit 22, the interpolation circuit 23, and the composing circuit 24 are the same as those described in the U.S. Ser. No. 08/045,038 proposed by the present inventor.

Figure 4:
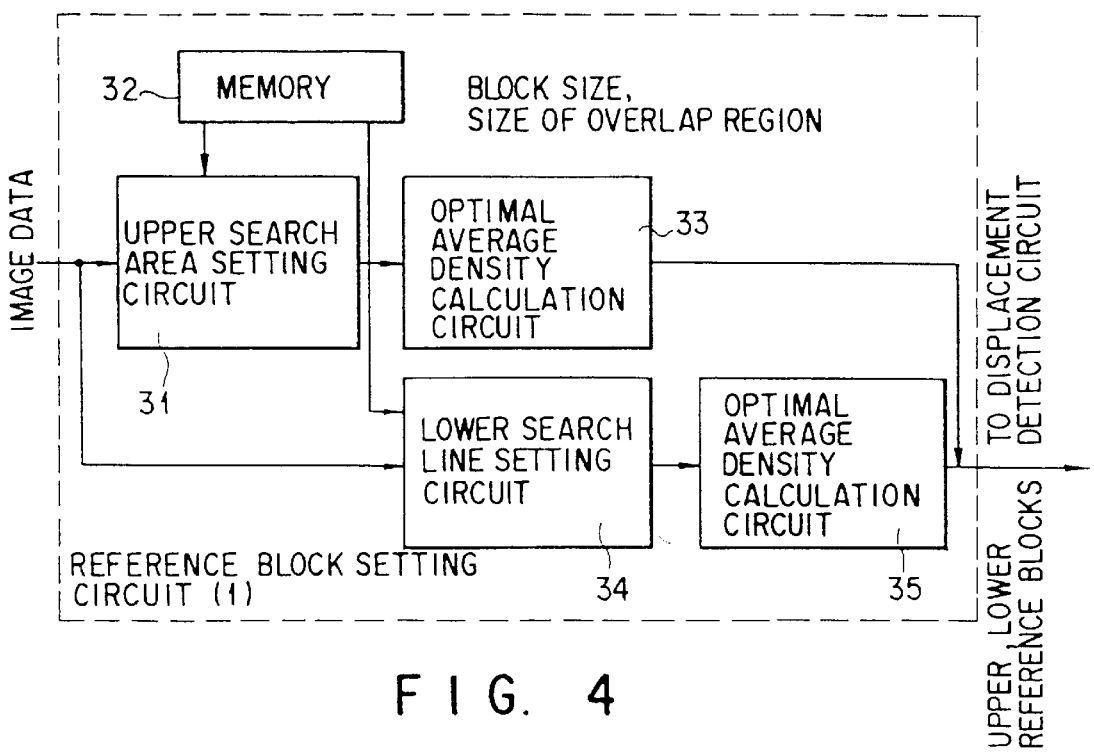
FIG. 4 is a block diagram showing a practical example of configuration of a reference block setting circuit shown in FIG. 3.

FIG. 4 shows a practical example of configuration of a reference block setting circuit shown in FIG. 3.

This reference block setting circuit (1) comprises an upper search area setting circuit 31 into which image data is inputted from a frame memory A17 not shown and which sets a search area 4 at an upper portion 3a of FIG. 1 a memory 32 for storing numerical values concerning sizes of a block and an overlap region which are used as references when the search area 4 is set, an optimal average density calculation circuit 33 for calculating an optimal average value of the density of image data within the search area, a lower search line setting circuit 34 for setting a search line (i.e., a reference block 6) at a lower portion 3b, and an optimal average density calculation circuit 35 for calculating an optimal average value of the density of image data within the search area on the search line.

Upper and lower reference blocks are outputted from the optimal average density calculation circuits 33 and 35 for upper and lower portions, respectively, to the displacement amount detection circuit 22 shown in FIG. 3.

Figure 5:
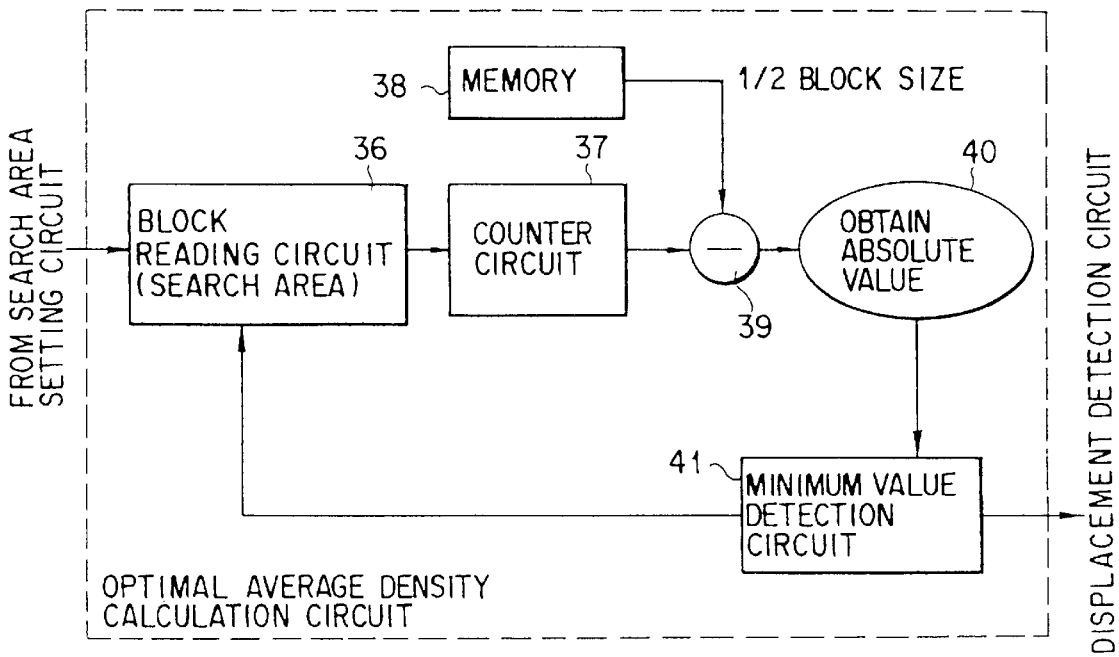
FIG. 5 is a block diagram showing a practical example of configuration of an optimal average density calculation circuit shown in FIG. 4.

Next, FIG. 5 shows a practical example of configuration of the optimal average density calculation circuit shown in FIG. 4.

This optimal average density calculation circuit comprises a block read circuit 36 for reading a block having a range corresponding to a reference block from image data within a set search area, a counter circuit 37 for counting the number of pixels of either "0" or "1", a memory block 38 for storing a ½ block size (i.e., the half of the total number of pixels in a block), a subtracter 39 for subtracting the ½ block size from the value counted for a predetermined number of times by the counter circuit 37, a calculator circuit 40 for obtaining an absolute value concerning the calculation results, and a minimum value detection circuit 41 for detecting a minimum value from the obtained values.

The ½ block size is thus stored by a memory and is then subtracted from the counted value (i.e., the number of pixels of "0" or "1" within a block), because the value of ½ is a value of high contrast, as expressed by the formula (1), and therefore, a minimum value is obtained by subtracting this value from the counted value.

In an image processing apparatus having a structure stated above, there may be a case in which the average density of the search area 4 in the overlap region 3 as shown in FIG. 1 and the average density of a reference block on the search line 7 are not desirable values, i.e., there is not correlation. It is therefore necessary to move the search area or search line, to carry out detection again.

Figure 6:
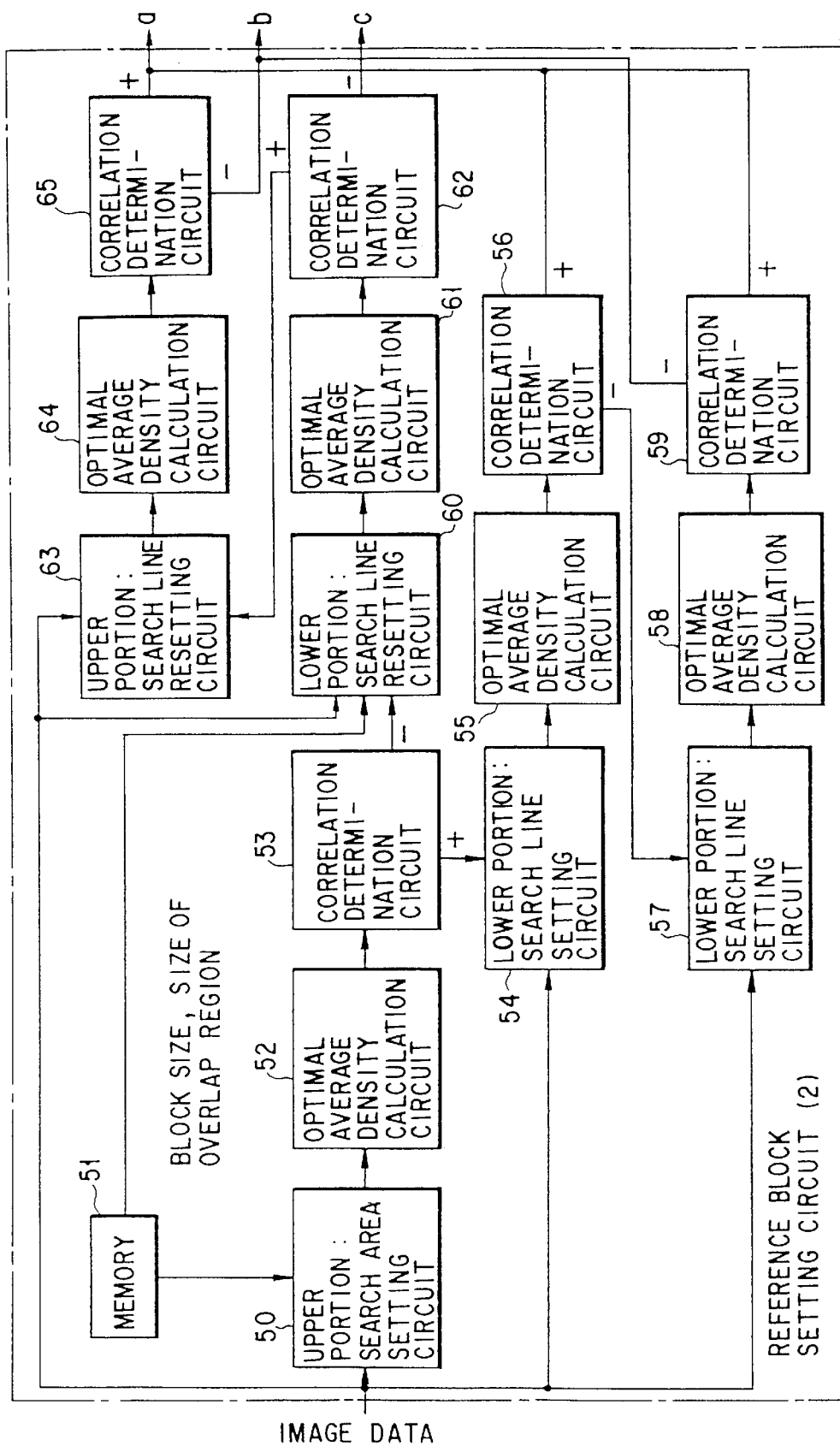
FIG. 6 is a block diagram showing a practical example of configuration of a reference block setting circuit used in an image composing apparatus according to a second embodiment of the present invention.
Figure 7:
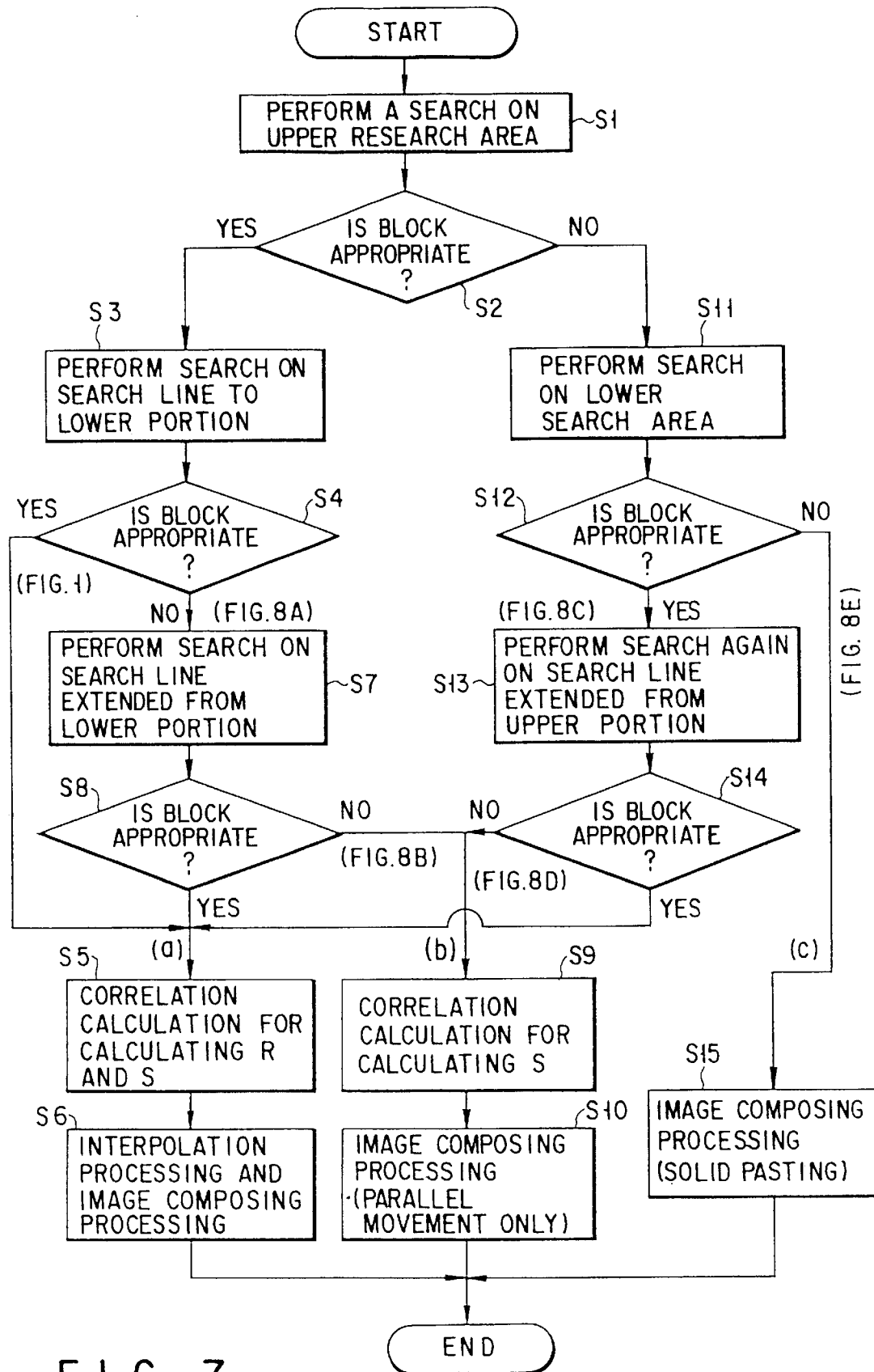
FIG. 7 is a flow-chart for explaining operation of the reference block setting circuit according to the second embodiment.

FIG. 6 shows a reference block setting circuit (2) used as an image processing apparatus in the second embodiment. Respective components of this reference block setting circuit perform the same operations as the reference block setting circuit (1), and therefore, specific explanation of those components will be omitted herefrom. The structure and operations thereof, however, will be explained below, with reference to FIG. 7 showing a flow-chart and FIG. 8 showing a positional relationship between a search area (or search line) within an overlap region and a reference block.

In this image processing apparatus, it is determined whether or not a reference block set in a search area has an appropriate average density. If the reference block does not have an appropriate average density, the search area or search line is moved to set a new reference block, and search is performed again, so that the apparatus is applicable to various kinds of image signal data.

At first, an upper search area setting circuit 50 sets a search area 4 as shown in FIG. 8A, on the basis of the block size and the size of an overlap region read from a memory 51. The optimal average density calculation circuit 52 calculates an average density of the reference block 5 set in the search area 4, and the correlation determination circuit 53 determines whether or not the reference block 5 is an appropriate one (steps S1 and S2).

If YES in the step S2, a search line 7 is extended to a lower portion 3b of the overlap region 3 by a lower search line setting circuit 54, and the correlation of a reference block 6 set on the search line 7 is searched (step S3). A correlation determination circuit 56 determines whether or the reference block 6 is an appropriate one (step S4).

If the correlation determination circuit 56 determines that the block 6 is an appropriate reference block (YES), a reference block as shown in FIG. 1 is set and displacement amounts R and S (where R expresses a rotation vector and S expresses a displacement vector) are calculated by a displacement detection circuit 22 (step S5), and interpolation processing is performed on the basis of displacement amounts R and S, thereby to compose images (step S6).

However, if NO in the step S4, an extended search line 7a as shown in FIG. 8A is extended from the lower portion 3b toward the search area 4 by a lower line resetting circuit S7, and correlation of the reference block 6 is searched by an optimal average calculation circuit 58 and a reference block determination circuit 59, thereby to determine whether or not there is correlation (steps S7 and S8).

If it is determined in the step S8 that the block 6 is an appropriate reference block (YES), the processing returns to the step S5, and the displacement amounts R and S are calculated, thereby to compose images. However, if it is determined that the block 6 is not an appropriate reference block (NO), the processing is brought into a condition as shown in FIG. 8B. The displacement amount S is calculated by the displacement detection circuit 22 (step S9), and image composing processing in which only parallel movements are carried out is performed on the basis of the displacement amount S (step 10).

In addition, if no in the step S2, the correlation determination circuit 62 determines whether the reference block 6 provided in the lower search area 8 set by the lower search area setting circuit 60 is an appropriate one or not (steps S11 and S12).

If it is determined in the step S12 that the block 6 is an appropriate reference block (YES), an extended search line is extended from the lower portion 3b toward the upper portion 3a by the upper search line resetting circuit 63, as shown in FIG. 8C, and correlation is searched again with respect to a reference block 5, thereby to determine again whether or not the block 5 is an appropriate reference block (steps S13 and S14).

If No in the step S14, the processing is brought into a condition as shown in FIG. 8D and then returns to the step S9. In the step S9, image composing processing is performed with use of only parallel movements on the basis of the displacement amount S. However, if YES in the step S14, the processing returns to the step S5 and the displacement amounts R and S are calculated, thereby to compose images. If NO in the step S12, the processing is brought into a condition as shown in FIG. 8E, and images are simply overlapped on each other (i.e., solidly pasted), thereby to complete composing processing (step S15).

From the above, in this embodiment, a movable search area and a movable search line are provided with respect to processing for setting a block used as a reference, so that a place having an optimal average density is searched and that an average density in the reference block is estimated. Therefore, high-speed processing can be achieved and various kinds of image signal data can be dealt with.

In the first and second embodiments described below, a reference point (or corresponding point) is extracted with the size of an overlap region being fixed. In addition, in Jpn. Pat. Appln. KOKAI Publication No. 3-182976, a reference point is extracted after an image within an overlap region which has already been known is binarized.

Figure 9:
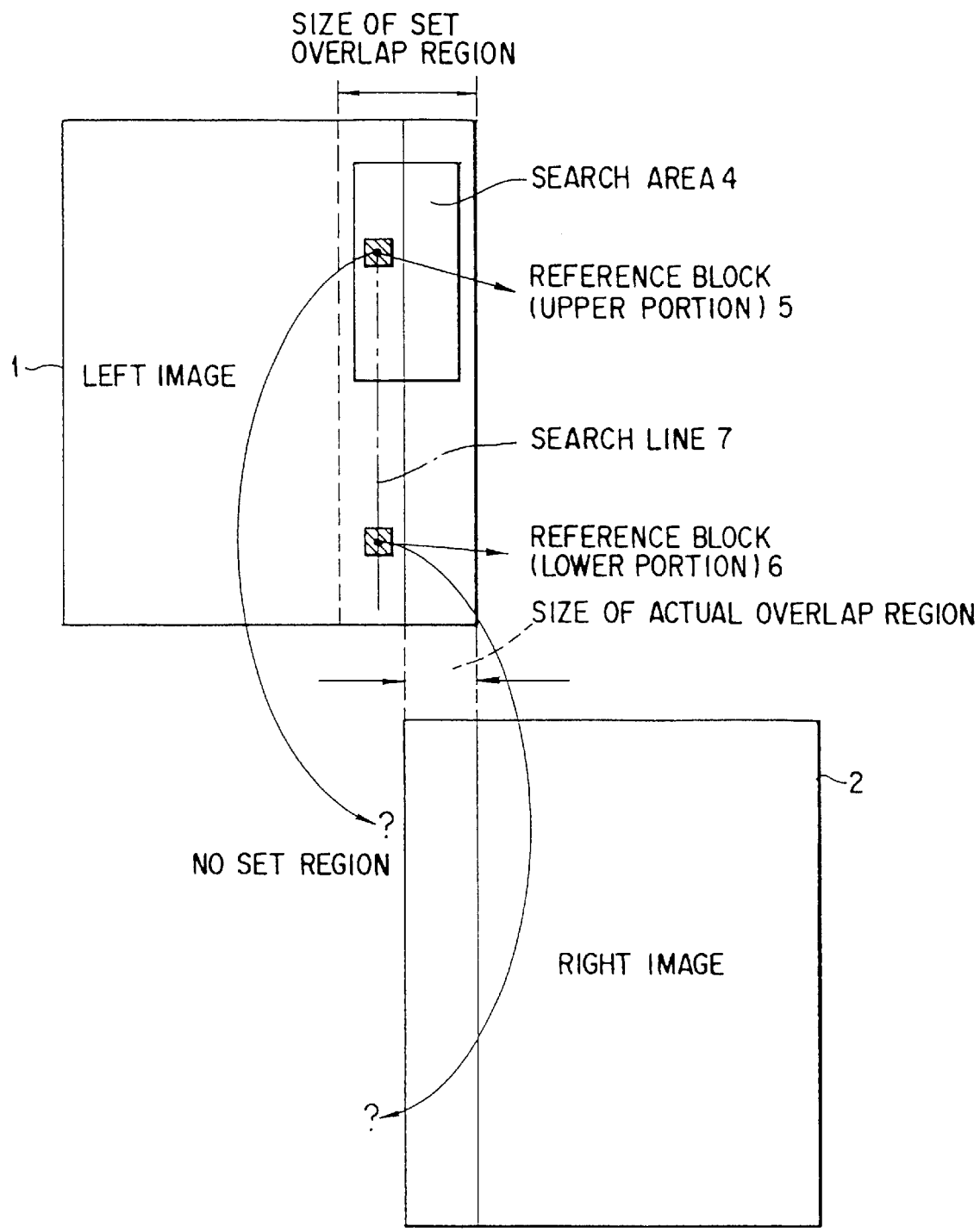
FIG. 9 is a view showing a positional relationship between a search area and a reference block where corresponding points are detected in no region.

If the size of the overlap region is fixed, images can be composed with each other as long as the displacement between the reference image and the image to composed is small. However, if the displacement is too large, no corresponding point can be detected, as shown in FIG. 9, and mismatching occurs. Especially, in case of an image pick-up apparatus of a portable handy-type images to be composed may be greatly displaced from each other due to movements of hands.

Therefore, an example of configuration of an image composing apparatus in which the size of an overlap region is variable will be explained as a third embodiment.

Figure 10:
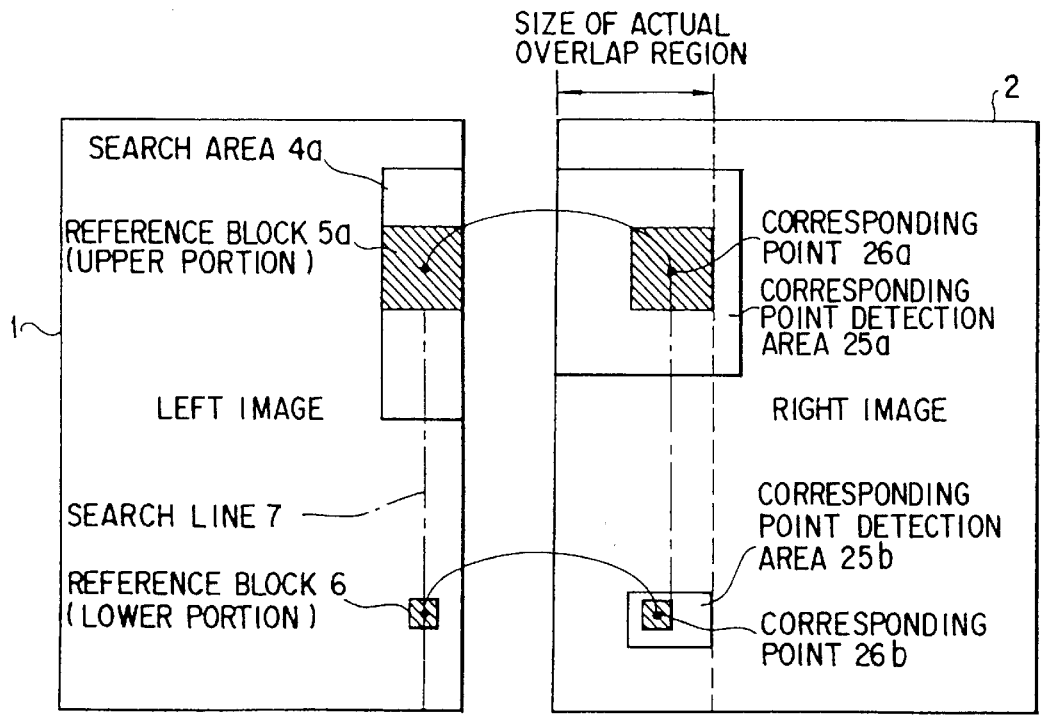
FIG. 10 is a view showing a positional relationship between a search area, a reference block, and a corresponding point when an image composing apparatus as a third embodiment of the present invention is used.
Figure 11:
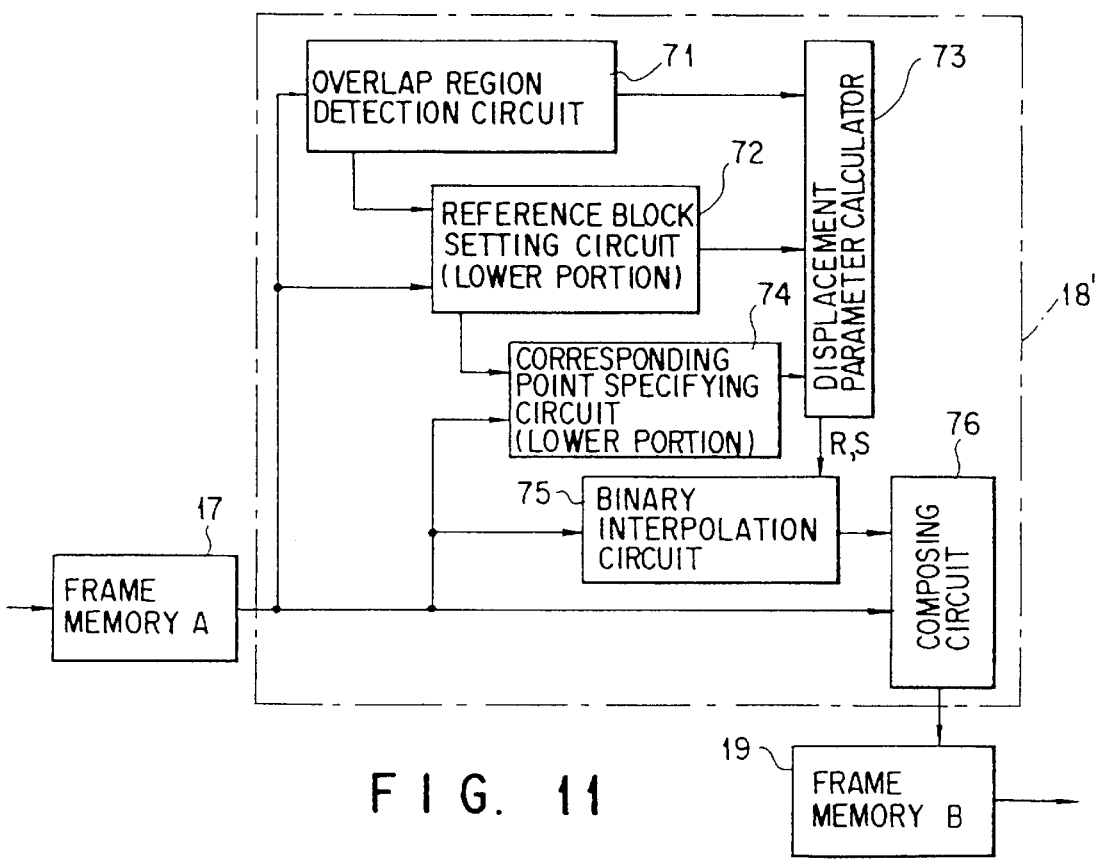
FIG. 11 is a block diagram showing an example of configuration of an image composing circuit in an image composing apparatus which carries out setting processing according to the third embodiment.

FIG. 10 shows a positional relationship between an overlap region, a reference block, and a reference point set therein, and a reference point, and FIG. 11 shows an example of configuration of an image composing circuit in an image composing apparatus which carries out setting processing thereof.

FIG. 11 shows a practical configuration of an image composing circuit, and the entire structure of an image composing apparatus is the same as that of an image composing apparatus shown in FIG. 2.

This image composing circuit comprises an overlap region detection circuit 71 for detecting the size of an actual overlap region from image data supplied from a frame memory A, a reference block setting circuit 72 for setting a lower reference block on a search line 7 on the basis of the detected overlap region and the upper reference block, a corresponding point detection circuit 74 for detecting a lower corresponding point 26b of the image to compose on the basis of a reference point 10 in FIG. 1 of the set reference blocks, a displacement parameter calculation circuit 73 for calculating a displacement parameter on the basis of the overlap region, the reference blocks and the corresponding point, a binary interpolation circuit 75 for binary-interpolating image data on the basis of displacement amounts R and S thus calculated, and a composing circuit 76 for composing the image data thus interpolated with the image data supplied from the frame memory A.

In this third embodiment, as shown in FIG. 10, an actual overlap region is detected and a search area 4a is set on a right-hand end line (corresponding to a search line) of the left-hand image. Further, the size of an upper reference block 5a is set to be, for example, a size of 51×51 pixels which is larger than the size used in the first embodiment. A place having an optimal average density is searched along the right side of the left-hand image (i.e., the reference image). The size of a lower reference block 6 is set to be the same size (17×17 pixels) as that of the reference block mentioned before, in order to reduce calculation amounts.

Detection of the upper corresponding point 26a is performed within a corresponding point detection area 25a which is set to be longer in the lateral direction. When the corresponding point is detected by matching processing, the position of the right-hand end line of the block indicates the size of an actual overlap region. A lower corresponding point detection area 25b is the same as that described with reference to the before-mentioned embodiments.

In this third embodiment, an upper reference block set to have a relatively large size is searched from a search area provided on the right side of the reference image. Hence, a point corresponding to the right-hand image to be composed with the reference image can be detected even if there is a large displacement between the images, provided that the image overlap each other. Thus, the size of an actual overlap region can be obtained, so that a search area for detecting a lower corresponding point on the image to compose can be properly set and processing can be achieved accurately and effectively.

Next, explanation will be made to an image composing apparatus according to a fourth embodiment in which detection of a corresponding point on an image to compose, with respect to a reference block (or reference point) on a reference image is performed at a higher speed than in the first to third embodiments. Here, the corresponding point means a point on the right-hand image, which corresponds to a reference point on an overlap region on the reference image.

The image composing apparatus according to this fourth embodiment is characterized by a displacement amount detection circuit, and therefore, explanation of the other components of the apparatus which are the same as those in the first embodiment will be omitted.

As a typical method of realizing high-speed detection of a corresponding point, template matching and structural matching are known. In this embodiment, the template matching is performed on a corresponding point detection area within an overlapped area, thereby to detect a corresponding point.

In general, in this template matching, for example, the area on which matching is performed to detect a corresponding point is previously fixed, as described in the Jpn. Pat. Appln. KOKAI Publication No. 63-64180. The larger the area is set, the more accurately the corresponding point is detected. However, the larger the area onto which matching is performed is, the greater the calculation amounts are, and the more difficult the high-speed processing is. By contrast, when an area is set to be small, mismatching occurs at a high probability.

Figure 12:
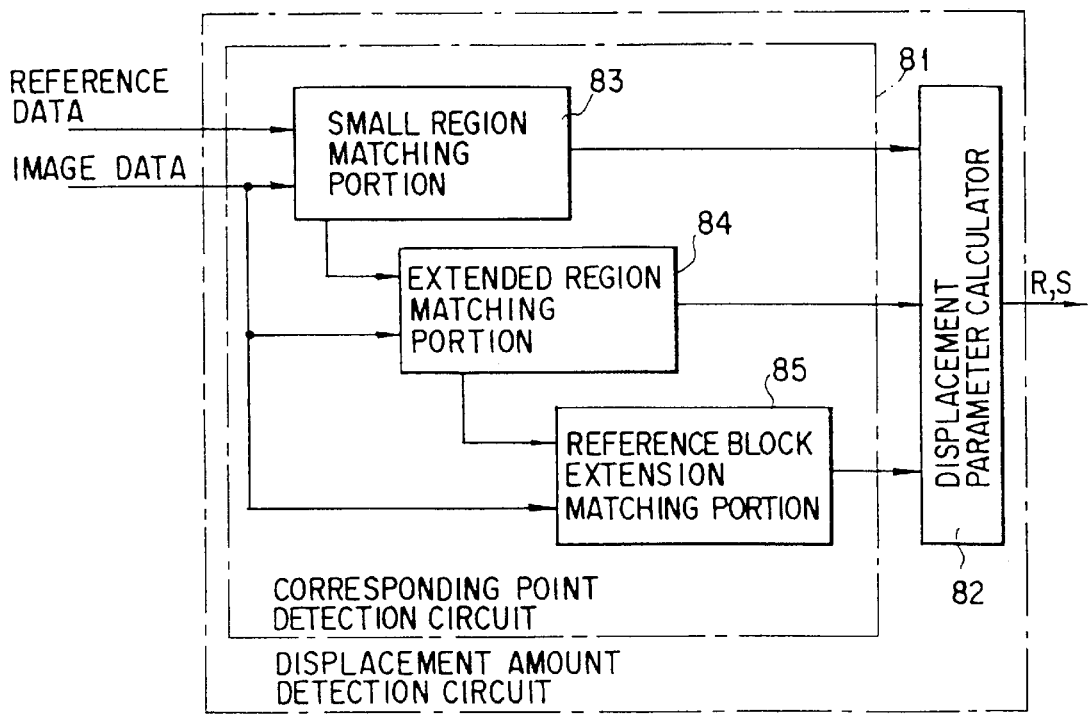
FIG. 12 is a block diagram showing an example of configuration of a displacement amount detection circuit used in an image composing apparatus used as a fourth embodiment according to the present invention.

FIG. 12 shows a structure of a displacement amount detection circuit.

This displacement amount detection circuit is roughly divided into two components, i.e., a corresponding point detection circuit 81 and a displacement parameter calculator 82.

The corresponding point detection circuit 81 comprises a small area matching portion 83 into which reference data outputted from the reference block setting circuit 21 shown in FIG. 3 and image data read out from the frame memory A not shown, for setting a search area of a small size and for performing matching processing thereonto, an extended region matching portion 84 for performing matching processing again onto an extended search area obtained by extending the search area when the result of matching process exceeds is reached or exceeded a predetermined threshold value, and a reference block extension matching portion 85 for performing matching processing by extending a reference block or by using two pairs of reference blocks positioned so as not to be adjacent to each other, when the result of matching process exceeds the threshold value.

Figure 13:
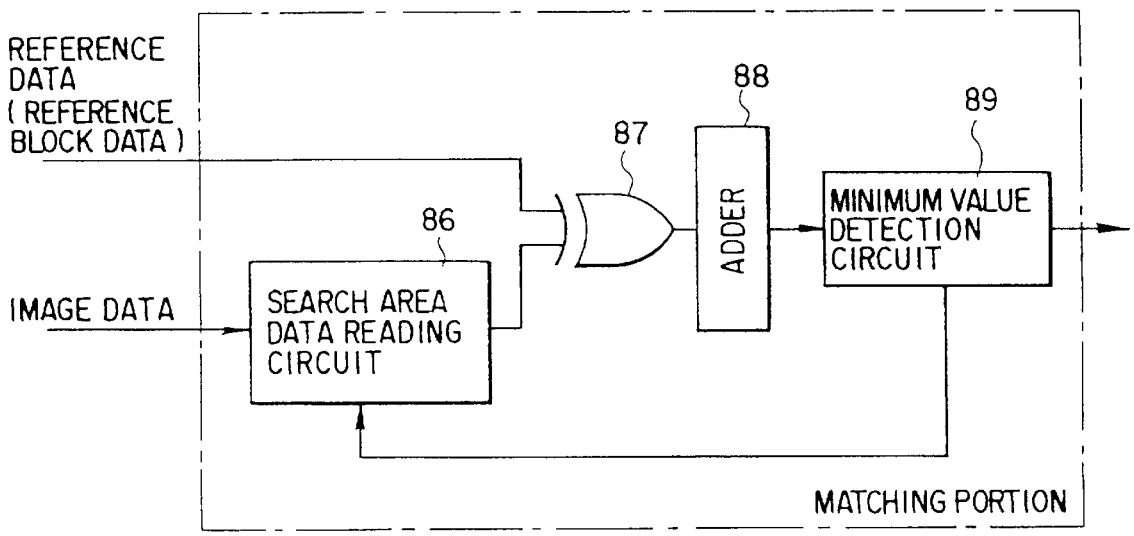
FIG. 13 is a block diagram showing a practical example of configuration of a matching portion in the displacement amount detection circuit shown in FIG. 12.

In addition, each of these matching portions have the same structure as shown in FIG. 13.

The matching portion shown in this figure comprises a search area data reading circuit 86 for reading inputted image data from a search area (or a search area block) on the basis of the size of a reference block, an XOR circuit 87 for obtaining an exclusive OR described below of reference data (or a reference block) and the read out search area data, an adder 88 for adding the outputs from the NOR circuit 87, and a minimum value detection circuit 89 for detecting a minimum value by comparing added values with each other and for outputting coordinates of a center point having the minimum value to the displacement parameter calculator 82 shown in FIG. 12.

Matching processing in the image composing apparatus according to the fourth embodiment will be explained, with reference to FIGS. 14 to 17.

In this matching processing, since binary images are composed with each other, the calculation speed is improved by an exclusive OR as described in the following formula:

$$\phi(t) = \sum_x T(x) \times ORS(x + t) \qquad (3)$$

where T(x) denotes a reference block and S(x) denotes a search area block.

At first, as shown in FIG. 14, a relatively small region is assumed to be a corresponding point detection area 27, and matching processing is carried out by a small area matching portion 83. The center point of this search area is obtained by carrying out mapping from the center point (or reference point) of a reference block detected on the left-hand image on the basis of the size of an overlap region.

Figure 15:
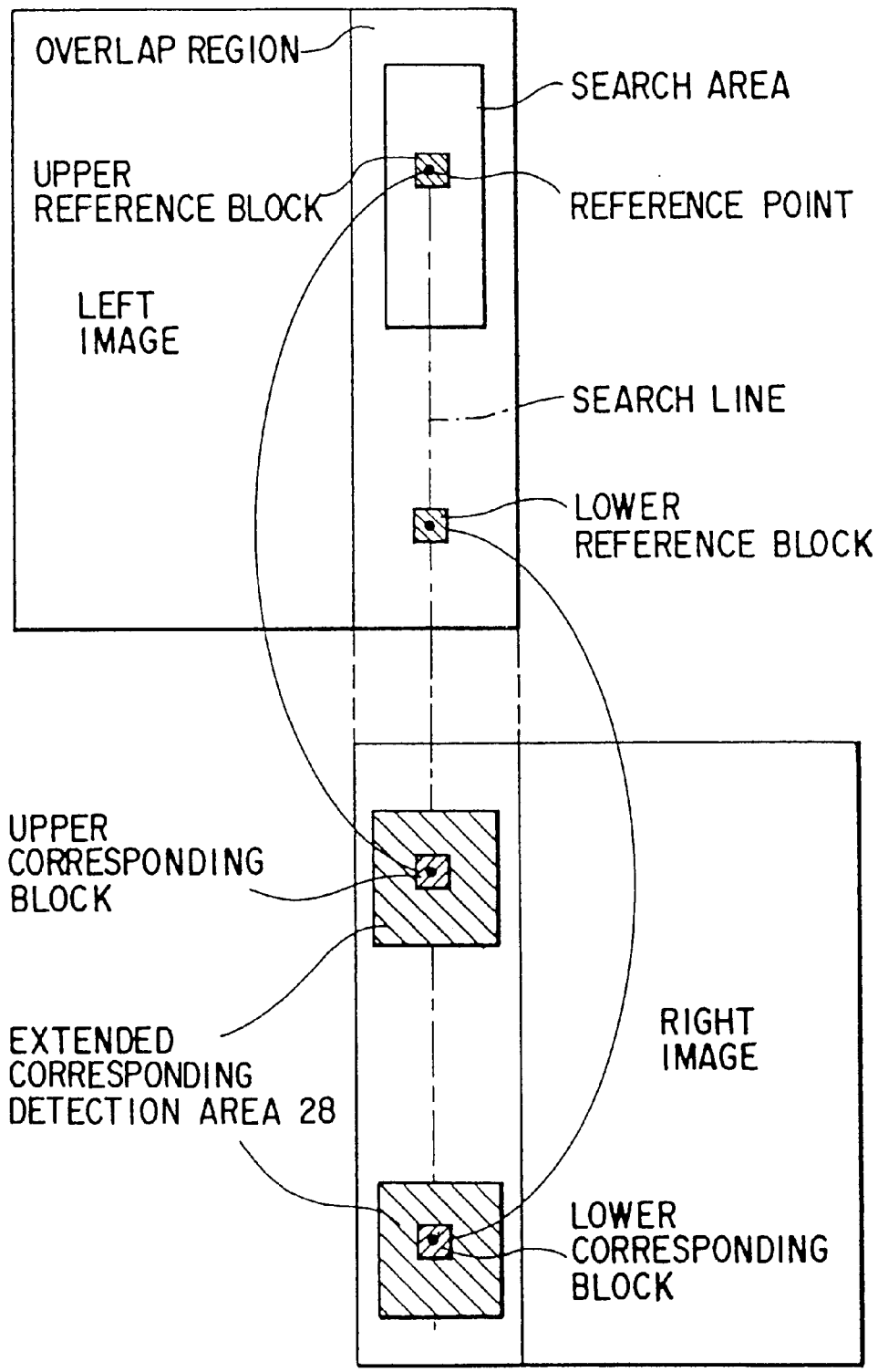
FIG. 15 is a view showing a positional relationship between a reference block and a search area which is an extended area, in the fourth embodiment.

Next, if a result supplied from the small area matching portion 83 is greater than a predetermined threshold value (e.g., 10% of the number of reference block pixels), it is determined that matching cannot be achieved, and as shown in FIG. 15, matching processing is performed again by an extended region matching portion 84 after a corresponding point detection area 28 is extended to be larger.

If a result supplied from the matching portion 84 reaches or exceeds a predetermined threshold value even in the area 28 thus extended, matching processing is carried out again by extending a template block used as a reference, as shown in FIG. 16. In this case, an estimation threshold value is set to 20% so that the estimation threshold value includes a slight margin, and therefore, matching can be achieved even when there is a relatively large displacement between images to be composed with each other.

If a result from the matching portion reaches or exceeds a threshold value, reference blocks may be provided at positions such that reference blocks are not adjacent to each other, and matching processing may be respectively carried out by using two pairs of reference blocks.

In this case, a corresponding point is determined, depending on the difference between two rotation angles obtained (which are displacement parameters). When the difference is large due to a large displacement, one of the rotation angles which has a smaller absolute value is selected, and when the difference is small, the displacement parameters are averaged.

In comparison with the above case using two pairs of reference blocks, matching processing can be performed at a higher accuracy if three or more reference blocks are used. Further, a displacement parameter may be obtained by setting a number of reference blocks and by analyzing results of matching processing for respective reference blocks.

Therefore, in the image composing apparatus according to the fourth embodiment, the size of the search area on which matching processing is performed and the size of the reference block are not fixed with respect to processing for detecting a corresponding point between images, but can be extended in correspondence with images to be composed with each other. Further, since matching is carried out through processing divided into a plurality of stages, matching processing can be achieved at an accuracy as high as in an apparatus in which an area is previously fixed to a large size, and a corresponding point can be detected at a high speed.

In addition, the above means for extending a search area onto which matching processing is performed is applicable to the third embodiment.

Next, interpolation of binary images in an image composing apparatus cited as a fifth embodiment of the present invention will be explained in the following.

A spline interpolation method and a linear interpolation method are generally known as a method for interpolating images when images are composed with each other. For example, in Japanese Patent Application No. 5-42402 proposed by the present inventor, a linear interpolation method is mainly used for an image pick-up apparatus which picks up images with a high resolution.

However, in some cases, images are required immediately after photographing depending on objects to be photographed or types of image pick-up apparatuses, and therefore, binary images of high quality need to be obtained by high-speed processing.

In a conventional linear interpolation method as shown in FIGS. 18A and 18B, addition and multiplication must be performed for at least four times and for three times, respectively, for every pixel, even when interpolation parameters are digitalized as in the third embodiment described in Japanese Patent Application No. 4-89090. Further, in many cases, data calculated by calculations of this interpolation method is not binarized data which can be classified into "1" and "0", and therefore, binarizing processing must be performed again. As a result, the time period required for processing is increased.

In the fifth embodiment of the present invention, an image composing circuit of an image composing apparatus which performs interpolation processing to binary images at a high speed will be explained. In this embodiment, except for the image composing circuit, components of the apparatus are the same as those used in the first embodiment, and explanation thereof will be omitted herefrom.

Figure 19:
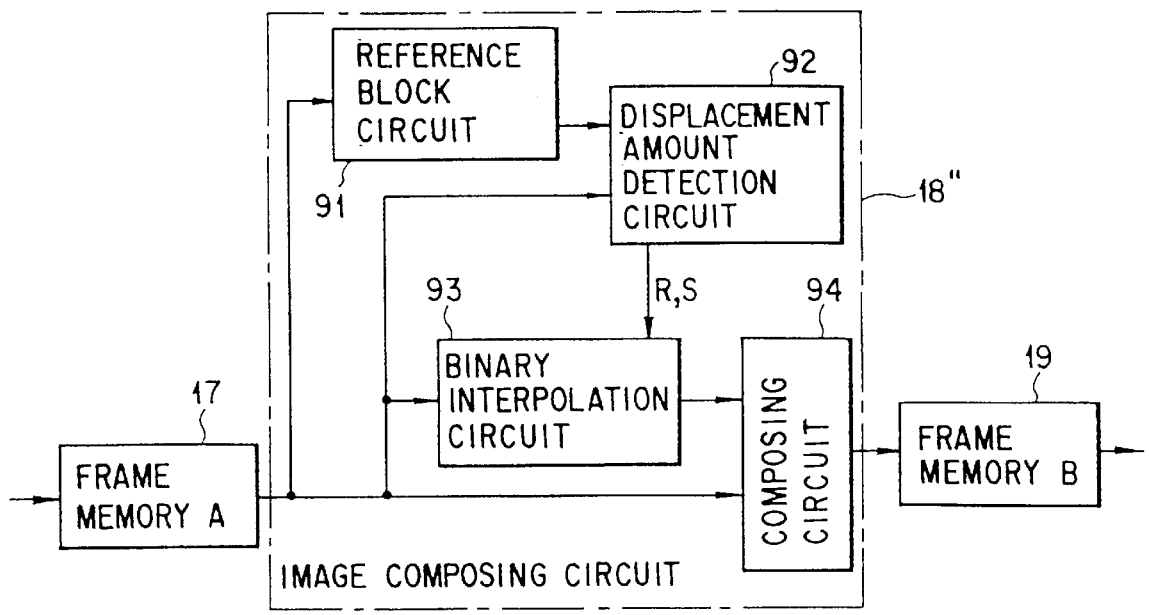
FIG. 19 is a view showing an image composing circuit of an image composing apparatus in a fifth embodiment according to the present invention.

As shown in FIG. 19, this image composing circuit comprises a reference block setting circuit 91 for setting a reference block on the basis of the reference image data read from a frame memory A17, a displacement amount detection circuit 92 for detecting displacement between the reference image data, read from the frame memory A17, and the image data to compose, a binary interpolation circuit 93 for binary-interpolating the image data to compose, on the basis of displacement amounts R and S detected, and a composing circuit 94 for composing the binary-interpolated image data with the reference image data, read from the frame memory A17.

Figure 20:
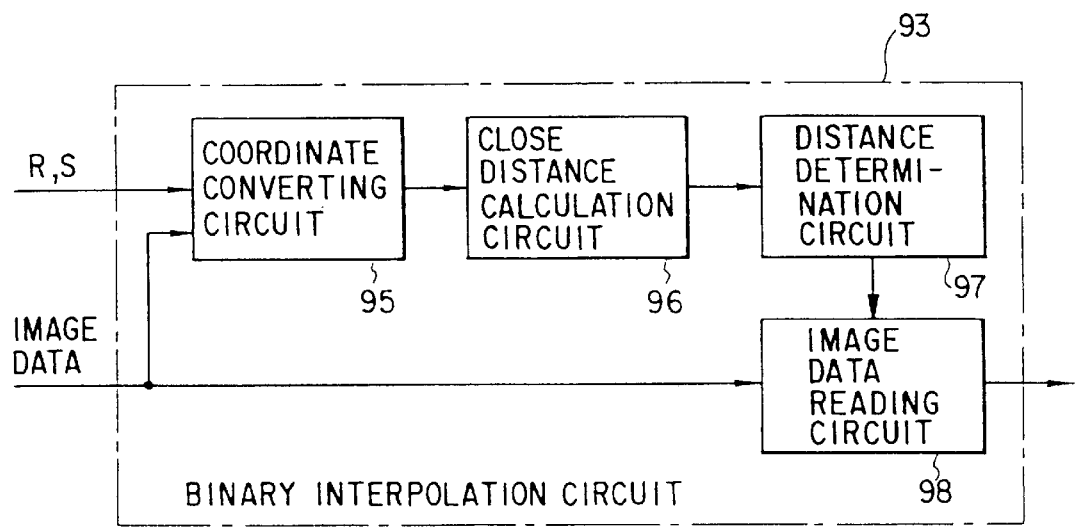
FIG. 20 is a view showing a practical example of a binary interpolation circuit shown in FIG. 19.

FIG. 20 shows an example of configuration of the binary-interpolation circuit. This binary-interpolation circuit comprises a coordinate convert circuit 95 for converting coordinates of a specified pixel (or source pixel) of an image to compose, on the basis of displacement amounts supplied from the displacement amount detection circuit 92 shown in FIG. 19, a close distance calculation circuit 96 for calculating a distance from a new pixel whose coordinates have been converted to a source pixel close to the new pixel, a distance determination circuit 97 for determining which region the position of the new pixel belongs to, depending on the calculated distance, and an image data read circuit 98 for reading image data to compose (or the value of a source pixel), after being interpolated, in accordance with a determination result.

Operations of this image composing circuit will be explained with reference to FIGS. 21A to 24.

As shown in FIGS. 21A to 21F, image data to compose is expressed by using values of "1" or "0". When a new pixel V' whose coordinates have been converted exists in a region 100 surrounded by four binary pixels of "1" as shown in FIG. 21A, the value of this pixel is determined as "1". On the contrary, the value of a pixel existing in a region 101 shown in FIG. 21B is determined as "0".

In other cases, the region is equally divided into pieces and the value of a new pixel is determined, depending on the value of the closest source pixel as shown in FIGS. 21C to 21F.

Therefore, as shown in FIG. 22, the region surrounded by four source pixels Va, Vb, Vc, and Vd close to the coordinates of a new pixel which have been converted is equally divided into four regions, and a new pixel V' belongs to one of equally divided regions. The region surrounded with the value of the closest source pixel of the region to which the new pixel belongs is divided into four areas, at most. The value of the pixel which should be interpolated is divided, depending on the position within one of these areas.

With reference to a flow-chart shown in FIG. 23, operation of interpolation of pixels will be explained.

At first, distances m, p from values m, p [or coordinates (V'x, V'y)] of a pixel V' to be interpolated to a close source image are calculated (step S21). These values m, p express distances from a pixel Va as shown in FIG. 18B. Note that m and p satisfy relations of $0 \leq m \leq 1$ and $0 \leq p \leq 1$.

Next, as shown in FIG. 22, a distance between a pixel V' to interpolate (new pixel) and a source pixel is defined as "1", and ½ of this distance is defined as a reference value. The reference value is compared to the above value m to determined which pixel (the new pixel V') is close to. That is, it is determined which pixel a position of the obtained value m is close to relative to a center point (a point corresponding to a center within the region surrounded by four source pixels Va, Vb, Vc, Vd shown in FIG. 22).

First, whether or not the obtained value m satisfies a relation of m<½ (step S22). If the value m is smaller than ½ (YES), the pixel V' is determined to belong to values of Va and Vc. Next, whether or not the value p satisfies a relation of p<½ (step S23). If the value p is smaller than ½ (YES), the pixel V' is determined to belong to a value of Va (step 24). According to the determination result of the values m and p, the pixel V' has a value of Va. However, if the value p is equal to or more than ½ (NO), the value V' is determined to belong to Va, and the pixel V' has a value of Vc (step 25).

Then, if the value m is determined to be equal to or more than ½ (NO) in the step S22, whether or not the value p satisfies a relation of p<½ is determined (step S26). If the value p is determined to be smaller than ½ (YES) in the step S26, the pixel V', has a value of Vb (step 27). However, if the value p is determined to be equal to or more than ½ (NO) in the step S26, the pixel V' has a value of Vd (step 28).

Figures 24A, 24B:
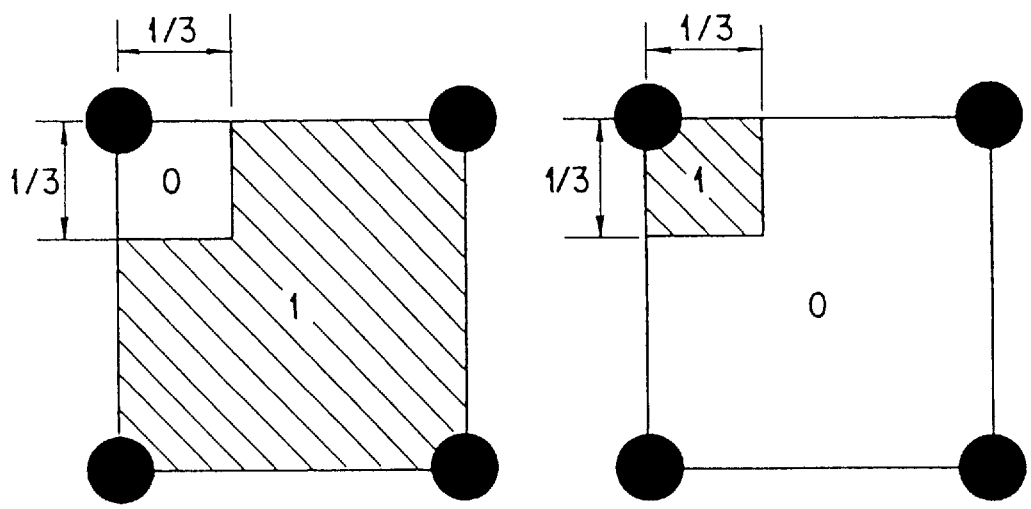
FIGS. 24A to 24B are examples of a region divided into four pixel areas.

Further, to divide the region surrounded by four pixels, if the pixel values constitute a rate of 3:1, the region is divided into regions of 3:1, as shown in FIGS. 21E and 21F. However, in this case, the region may be otherwise divided into divisions of 8:1, on the basis of the distance between pixels, as shown in FIGS. 24A and 24B.

Therefore, in this fifth embodiment, interpolation processing of binary images is carried out such that a pixel region surrounded by four pixels close to a pixel to be interpolated is equally divided and that the pixel to be interpolated is interpolated so as to have the value of the pixel closest to the pixel to be interpolated among the four pixels. Therefore, high-speed processing can advantageously be achieved.

Next, an image composing apparatus of a sixth embodiment according to the present invention will be explained.

In this sixth embodiment, improvements can be attained as follows in comparison with the before-mentioned an average density estimation formula (2) of a reference block in the first embodiment.

$$p < C0/C < (1-p) \text{ or}$$

$$p < C1/C < (1-p) \quad (4)$$

Note that p satisfies a relation of 0<p<20%. This range of p is an optimal range defined on the basis of experimental test results, like in the formula (2).

As long as the formula (4) is not satisfied, it is determined that the reference block is not an appropriate one.

This formula (4) is more simple than the formula (2) and calculation can be facilitated. Further, if the average density is determined by using the formula (4) or (2) and if the value of p is determined to be close to limit values of the above range, indicating that the block is appropriate as a reference block, the speed of processing for detecting a corresponding point as described in the fourth embodiment is influenced.

Therefore, matching cannot be achieved with a threshold value of 10% in the small area matching portion 83 shown in FIG. 12 due to the difference or displacement amount between binarizing results of left-hand and right-hand images. As a result, there is a high possibility that the processing proceeds to the next step, i.e., the processing by the extension matching portion 84, or to the processing by the reference block extension matching portion 85, so that a long time period is required to carry out processing for detecting a corresponding point. The processing is thus performed at a low efficiency.

However, if the correlation determination circuits 62 and 65 shown in FIG. 6 determine that a reference block has an appropriate average density, further determination is made by using the following formula (5) obtained by modifying the above formula (4).

$$(1-p-\alpha) < C0/C \text{ or } C0/C < (p+\alpha) \text{ or}$$

$$(1-p-\alpha) < C1/C \text{ or } C1/C < (p+\alpha) \quad (5)$$

Note that α satisfies a relation of 0<α<5%. As long as this formula (5) is satisfied, it is assumed that the reference blocks has an appropriate average density. When the corresponding point detection processing (FIG. 12) is performed, a predetermined threshold value for determining matching is slightly loosened. For example, the threshold value of 10% set in the small area matching portion 83 may be change to be fall within a range of 15% to 20%, so that the search areas or the reference block may not be expanded. If the threshold value is changed so, however, there will be some difference between the binarizing results of the left-hand and right-hand images.

Even when a displacement amount is relatively large, matching can substantially be achieved by the small area matching portion. Therefore, processing for extending a search area and a reference block is not necessary, and high-speed processing can be performed more efficiently. Note that the above range of α is set as an optimal range obtained from experimental test results.

Next, an image composing apparatus of a seventh embodiment will be explained below.

In general, there is a case in which there are differences in sensitivity between left-hand and right-hand images within a region where these two images are overlapped on each other, due to shading of a CCD or peripheral circuits thereof or due to time series photographing, even if one single object is photographed.

In this case, if binarizing processing is performed by the binarizing circuit 16 of the first embodiment and if high-speed processing and a simple circuit configuration (for the purpose of reducing costs) are required, a simple binarizing method (e.g., binarizing with use of a fixed threshold value) may be practically used in place of the binarizing processing as stated above. If the simple binarizing method is used, however, different results will be obtained in the region where the left-hand and right-hand image overlap, causing mismatching when the corresponding point in the image to compose is detected.

In this respect, two binarizing methods are explained in this seventh embodiment.

At first, the sensitivities of left-hand and right-hand images (i.e., the reference image and the image to compose) are increased to an equal sensitivity, and then, the same binarizing is performed on the images. Specifically, the overlap region of the left-hand or right-hand image is used as a reference, and sensitivity correction is performed on the other image. For example, MAX, MIN, and average values are calculated within the region where the left-hand and right-hand images are overlapped on each other, with the left-hand image being used as a reference. Then, a GAIN value is corrected with respect to the right-hand image, and thereafter, average value shift processing is performed to obtain an equal average value.

Secondly, binarizing is performed by using different binarizing threshold values, depending on the difference in the sensitivity between the left-hand and right-hand images. For example, average values are respectively obtained for overlap regions of left-hand and right-hand images, and different threshold values are determined on the basis of the average values. The binarizing is then performed.

An image composing apparatus of an eighth embodiment will be explained below.

Figure 23:
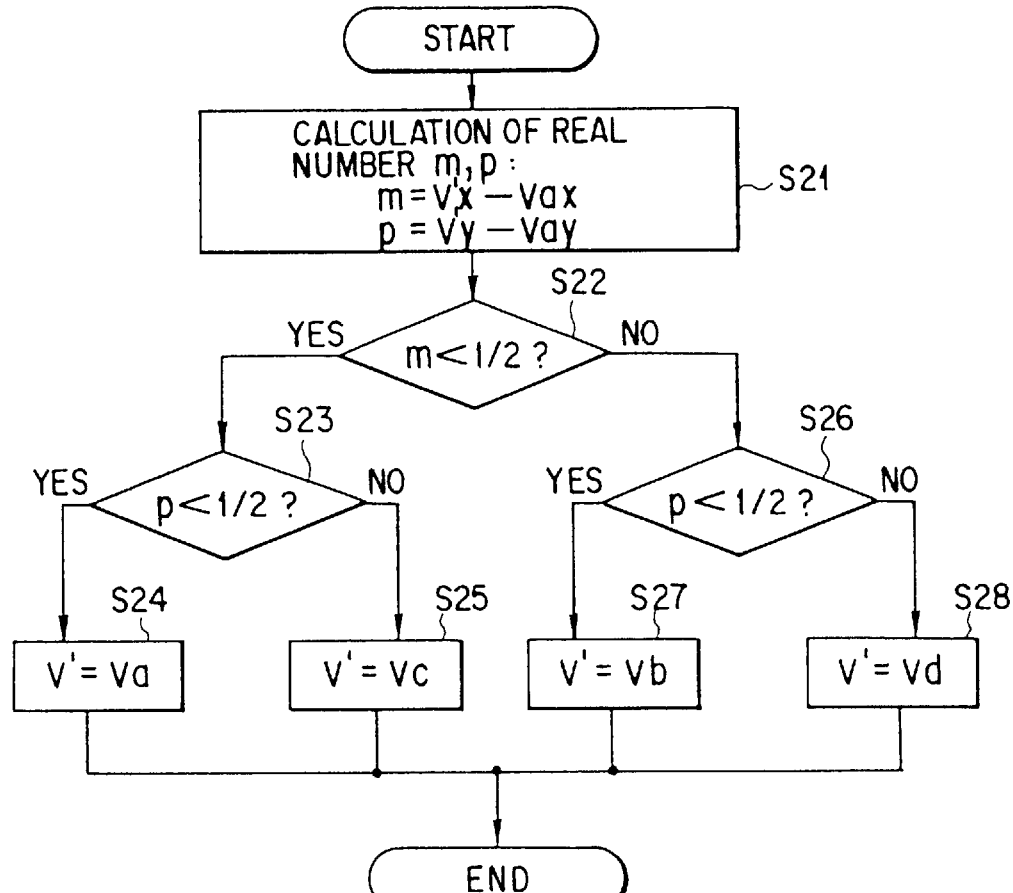
FIG. 23 is a flow-chart for determining pixel values to be interpolated which are positioned in a region divided into four pixel areas.

In the above-mentioned fifth embodiment, at least two subtraction calculations and two if-clauses are necessary when binary interpolation is performed, as shown in FIGS. 22 and 23.

Figure 25:
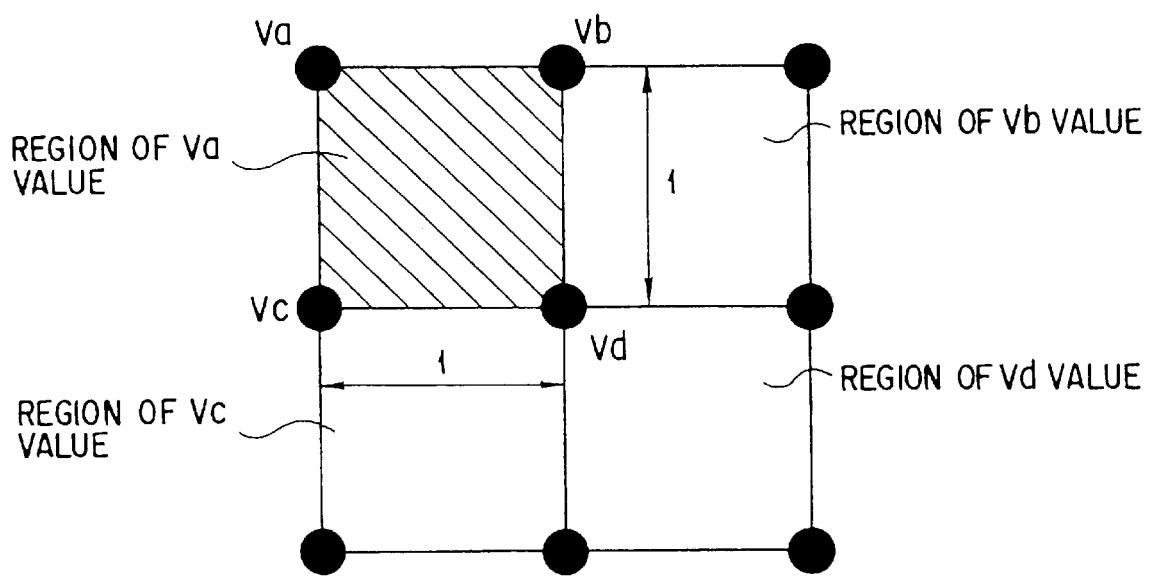
FIG. 25 is a views for explaining an example in which a close pixel is decided by half-adjusting.

In the eighth embodiment, processing can be achieved at a much higher speed, by half-adjusting coordinates V'x and V'y simply changed and by, for example, selecting the left upper pixel closest to a target-pixel as shown in FIG. 25, in place of using subtraction calculations and if-clauses as in the fifth embodiment.

As has been specifically described, according to the present invention, it is possible to provide an image composing apparatus in which a displacement amount between images to be composed with each other is obtained by setting a reference block having an optimal average density and by detecting a corresponding point, on the basis of a search area and a search line which are movable and have arbitrarily variable sizes, so that images are interpolated and composed by high-speed processing.

Next, the image composing apparatus according to the ninth embodiment will be explained.

Each embodiment described above is applied to composing binary images, on the other hand, the image composing apparatus according to the ninth embodiment is applied to composing multi-value images such as color images.

In the first embodiment, the first reference block and the second reference block are set on the basis of their average densities, the positions (corresponding points) in the image to compose corresponding to the first and second reference blocks are detected on the basis of correlation, images are interpolated in accordance with the calculated displacement amount, and two binary images are connected with each other.

However, in the ninth embodiment, a search area is set within the overlap region, and a reference block is set to a position having a high dispersion value within the search area. Preferably, a plurality of search areas and reference blocks are set in order to ensure an accuracy of composing images.

This dispersion value denotes a criterion for an average dispersion of a pixel value of pixels existing in the reference blocks. Also, the above average density of the blocks is one criteria of dispersions of binary images. The position having a high dispersion value is a position having a large average dispersion of pixel values of the pixel, concretely, a position having a high contrast.

In general, when the image is composed at a position having a low contrast in the image, mismatching is apt to occur, thereby it is necessary to set the reference block to the position having a high contrast. Since the position having a high dispersion value has a high contrast, in the ninth embodiment, a dispersion value for easy calculation processing is substituted in order to detect the position having a high contrast.

The embodiment will be schematically explained with reference to FIG. 26.

Figure 26:
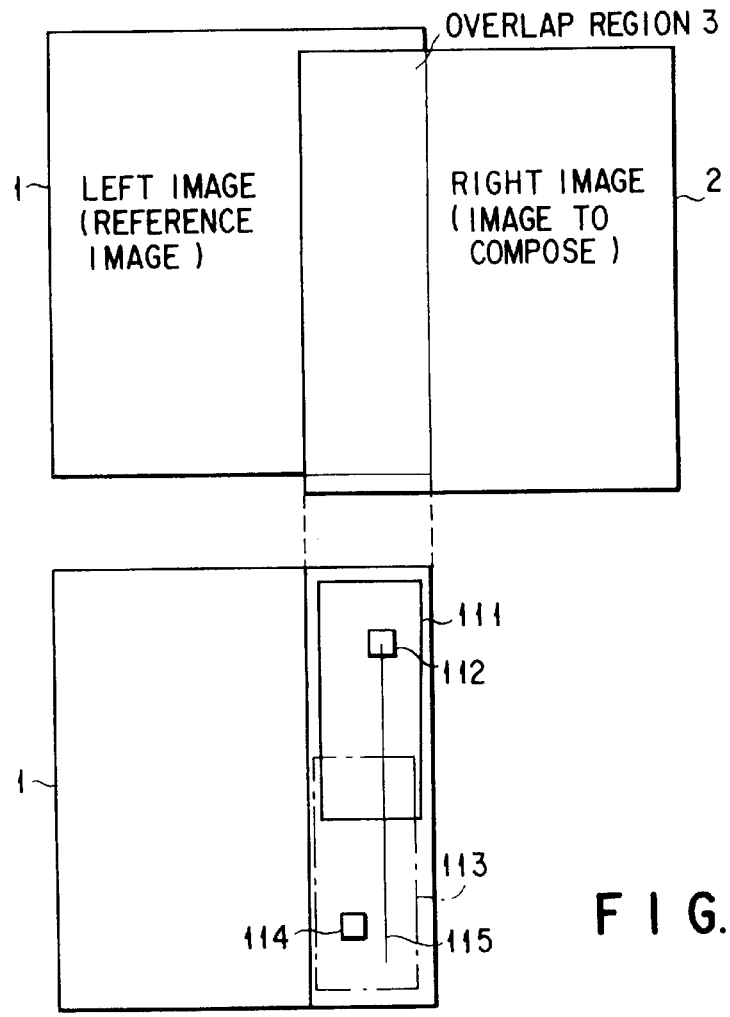
FIG. 26 is a diagram for explaining how the image composing apparatus according to a ninth embodiment of the invention connects multi-value images.

Referring to FIG. 26, a left image 1 is an image to be composed (a reference image), a right image 2 is an image to compose, and the region where these two images are overlapped on each other is denoted as an overlap region 3. FIG. 26 shows an example in which two search areas and two reference blocks are set within the overlap region 3 so that two images are composed with each other.

First, a search area 111 having an arbitrary size is set in the overlap region 3. A reference block 112 is set to a position having a high dispersion value in the search area 111. The size of these reference blocks and search areas may be similar to that of the above embodiments.

Next, similarly to the reference block 112, a search area 113 having an arbitrary size is set in the overlap region 3, and a reference block 114 is set to a position having a high dispersion value in the search area 113. The search area 113 may be same as the search area 111 or have a region where these two search areas are overlapped on each other. Note that the positions of respective reference blocks in the two search areas must not be overlapped on each other. Preferably, two reference blocks are spaced apart as much as possible in order not to reduce the accuracy of composing images.

Also, instead of setting the search area 113, an extended line (or search line) 115 is extended from the center point of the reference block 112, and determination may be performed as to whether or not the reference block 114 is set on the search line 115. A search is performed only on the search line 115. The amount of calculations necessary for searching operation can therefore be reduced.

Setting processing for these search areas 111, 113 and the reference blocks 112, 114 will be concretely explained.

Candidate of reference blocks (hereinafter referred to as "C. R. B.") having the same size as the predetermined reference blocks in the search areas 111 and 113 are set as a block suitable for setting the reference blocks. The areas may have different sizes. For every candidate blocks, the dispersion value (a primary dispersion) V is given by the following formula (6):

$$V = 1 \Big/ N \left( \sum_{i=(\text{in the } C.R.B.)} |S_i - \overline{S}| \right) \qquad (6)$$

where Si denotes a pixel value in the suitable reference block, and $\overline{S}$ denotes an average value of the pixel value in the C. R. B.

The C. R. B. are moved, in units of bits, to some positions in the search areas so that respective dispersion values are calculated. The position where the maximum dispersion value is obtained is temporarily set as C. R. B.

If the dispersion value is excessively small, similarly to the case of composing binarized images, mismatching occurs at a high possibility. In order to solve this problem, the dispersion value is estimated by the following formula (7).

$$V > p*255 \qquad (7)$$

If the maximum value of the dispersion value V calculated by the formula (6) satisfies the requirement of the formula (7), C. R. B. is defined as a real reference block.

On the contrary, if the obtained maximum value does not satisfy the requirement of the formula (7), "No valid feature" is determined, and the temporarily set block is canceled. Note that the value p may be set to substantially 10% from experience.

Also, the value "255" is the maximum value in case of the pixel value represented by 8 bit, and varies depending on the number of bit representative of data.

When an image to compose is a color image, respective dispersion values of each color are added by the following formula (8) in order to calculate the dispersion value (the dispersion value of the color image) V. Since a color information can be used, it is possible to set more effective reference block than the binarized image or a gray scale image.

$$V = 1/3N \left( \sum_{j=R,G,B} \sum_{i=(\text{in the } C.R.B.)} |S_{ij} - \overline{S}_j| \right) \qquad (8)$$

Where, $\overline{S}_j$ denotes a pixel average value for every color, and N is the number of pixels existing in the C. R. B. Also, j may be j=C, M, Y, or j=C, M, Y, K aside from j=R, G, B. In this case, the following formula is expressed (hereinafter referred to as, R=red, G=green, B=blue, C=cyan, M=magenta, Y=yellow, K=black).

$$V = 1/3N \left( \sum_{j=C,M,Y} \sum_{i=(\text{in the } C.R.B.)} |S_{ij} - \overline{S}_j| \right) \qquad (8\text{-}1)$$

Also, the color value is converted to a brightness value, and the brightness value may be substituted to the formula (6), or the formula (6) may be applied to an arbitrary color image of three or four colors. In this case, although the accuracy is slightly reduced, compared to using the formulas (8) and (8-1), it is possible to set the reference block at a high speed.

Estimation with use of the primary dispersion value is described above, and further a secondary dispersion value obtained by the following formula (9) may be used in order to estimate the dispersion value.

$$V = 1 \Big/ N \left( \sum_{i=(\text{in the } C.R.B.)} (|S_i - \overline{S}|)^2 \right) \qquad (9)$$

Figure 27:
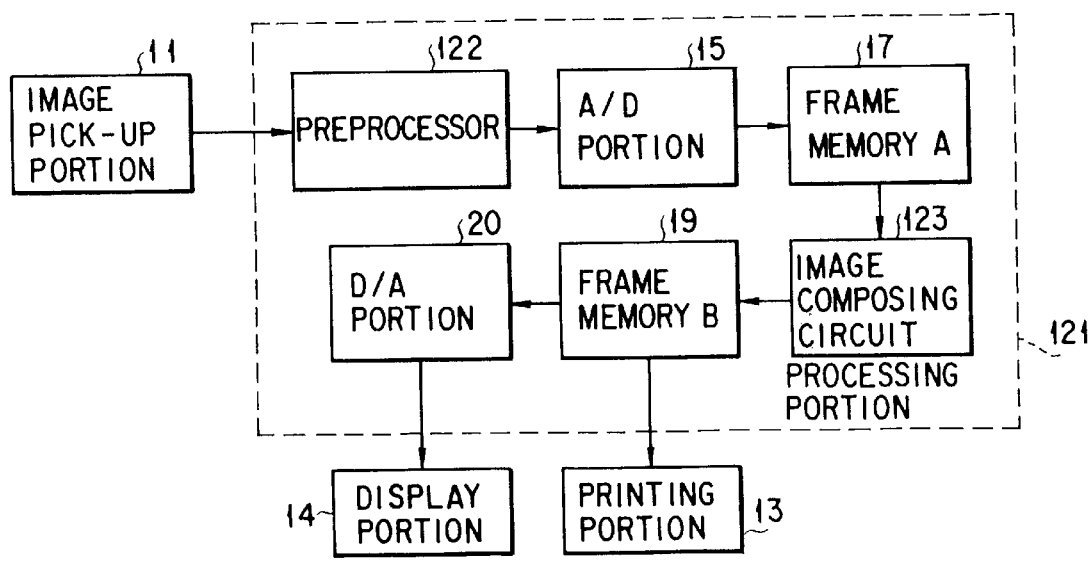
FIG. 27 is a block diagram showing the image composing apparatus according to the ninth embodiment, which is designed to connect color images, or multi-value images.

FIG. 27 is a block diagram showing an example of configuration of the image composing apparatus used as the ninth embodiment.

The image composing apparatus according to the ninth embodiment comprises an image pick-up portion 11, an image composing portion 121, a display portion 14 and a printing portion 13.

The configuration of the image composing portion 121 is constituted on the basis of the image composing portion 12 shown in FIG. 2. In order to compose images for connecting multiple images or color images, the binarizing circuit 16 shown in FIG. 2 is not necessary, and alternatively, a preprocessor 122 for previously separating colors of an image signal inputted from the image pick-up portion 11 before setting the reference block is provided.

Also, an image composing circuit 123 is constituted similarly to the image composing circuit 18 shown in FIG. 3 having the displacement amount detection circuit 22, the interpolation circuit 23 and the composing circuit 24 except a reference block setting circuit 124.

Figure 28:
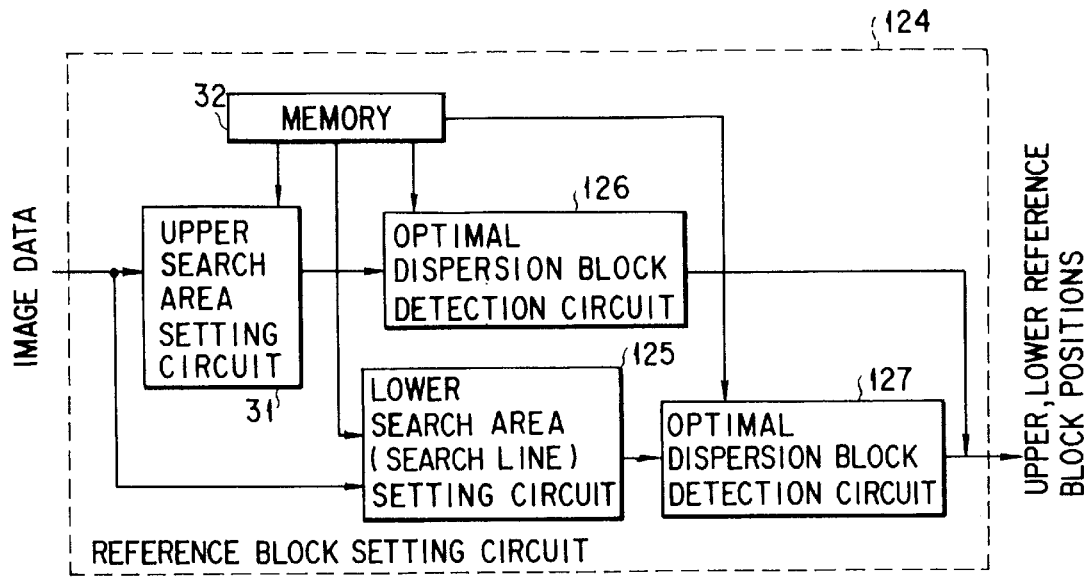
FIG. 28 is a block diagram illustrating the reference block setting circuit incorporated in the apparatus of FIG. 27.

FIG. 28 is a block diagram showing an example of configuration when the reference block setting circuit 124 is applied to the multiple image or color image. Compared to the configuration shown in FIG. 4, the image composing apparatus of the ninth embodiment comprises a lower search area (search line) setting circuit 125 instead of the lower search line setting circuit 34, further optimal dispersion block detection circuits 126, 127 instead of the optimal average density calculation circuits 33, 35, and optimal dispersion block detection circuits 126, 127 in which a block size data stored in the memory 32 is inputted, which is different from the configuration shown in FIG. 4.

The frame memory A 17 and frame memory B 19 store respective color image data obtained by the image pick-up portion 11. For example, each color may be stored in each frame.

Figure 29:
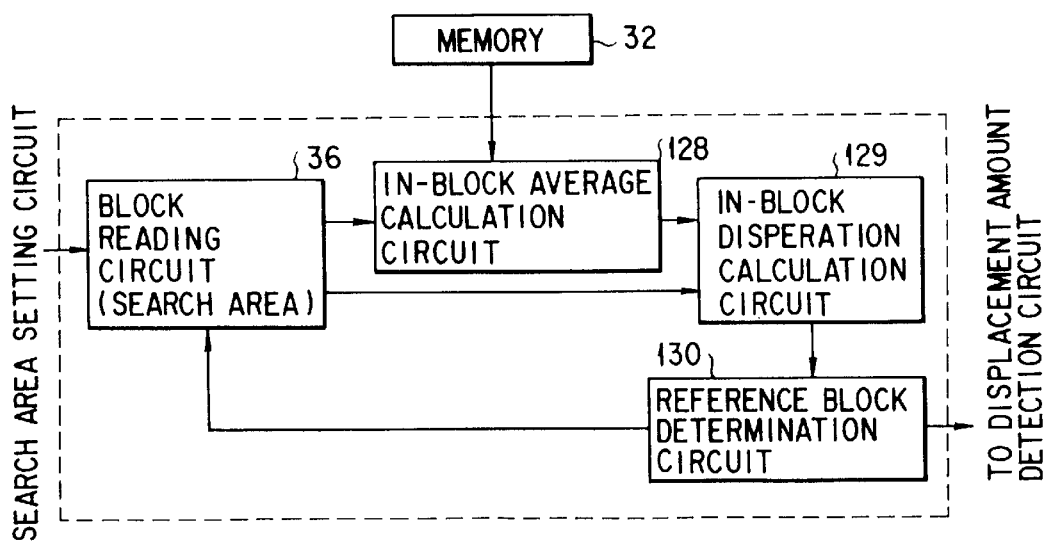
FIG. 29 is is a block diagram showing the optimal dispersion block detection circuit provided in the reference block setting circuit shown in FIG. 28.

Next, FIG. 29 is a block diagram showing an example of a concrete configuration of the optimal dispersion block detection circuits 126 and 127.

On the basis of an upper search area and a lower search area (or search line) which are set to an arbitrary size respectively by the upper search area setting circuit 31 and the lower search area (search line) setting circuit 125, a suitable reference block data is read out from the image data in a block reading circuit 36. Next, an in-block average calculation circuit 128 calculates the in-block average from the suitable reference block data.

An in-block dispersion calculation circuit 129 calculates an in-block dispersion of C. R. B. by above-mentioned formulas (6)–(9) in accordance with an average value calculated in the in-block average calculation circuit 128 and an output from the block reading circuit 36.

A reference block determination circuit 130 detects a maximum value of in-block dispersions of a C. R. B. which are set within the search area, and stores the position of the C. R. B. at this time.

Further, determination is made by reference block determination circuit 130 as to whether or not the previously obtained maximum value of the in-block dispersions of the C. R. B. satisfies the formula (7), if it is determined that the maximum value satisfies the formula (7), the stored suitable in-reference-block position is outputted as a real reference block position. If it is not determined that it does, a signal representative of. "No valid reference block" is outputted.

As shown in FIG. 30, the image composing apparatus according to the ninth embodiment comprises optional dispersion block detection circuits 131, 132, 133, 134, 135 instead of the optimal average density calculation circuits 52, 55, 58, 61, 64, and reference block determination circuits 136, 137, 138, 139, 140 instead of correlation determination circuits 53, 56, 59, 62, 65, thereby, even if combined with the second, third and fourth embodiments, similarly, it is possible to compose images for connecting multiple images or color images.

How to match the reference block with the block to compose will be explained. As a method for detecting the corresponding point, there is a method for applying a template matching. This method is well-known in the field of image processing. For example, in case of composing the gray scale images, correlation value C(t) determined by following formula (10) is estimated and the point at which C(t) has a minimum value is determined as the corresponding point.

$$C(t) = \sum_{i=(in\ the\ C.R.B.)} |S_i - T_i(t)| \qquad (10)$$

Where, Si denotes the pixel value within the template block in the reference image, and Ti$^{(t)}$ denotes the pixel value within the block at a position t in the search area. In case of composing the color images, the color information is effectively used so that it is possible to carry out matching processing more accurately than the binarized or gray scale images.

A correlation value of this template matching for color images is obtained by the following formulas (11) and (11-1).

$$C(t) = \sum_{j=R,G,B} \sum_{i=(in\ the\ C.R.B.)} |S_{ij} - T_{ij}(t)| \qquad (11)$$

$$C(t) = \sum_{j=C,M,Y} \sum_{i=(in\ the\ C.R.B.)} |S_{ij} - T_{ij}(t)| \qquad (11\text{-}1)$$

Where, $S_{ij}$ represents the pixel value for every color within the template block, and Tij(t) represents the pixel value for every color within the block at the position t in the search area. The formulas (11) and (11-1) may be modified to the formulas (12) and (12-1). Thereby, it is possible to weight each color image in accordance with importance of colors (R, G, B or C, M, Y).

$$C(t) = \sum_{j=R,G,B} W_j \sum_{i=(in\ the\ C.R.B.)} |S_{ij} - T_{ij}(t)| \qquad (12)$$

$$C(t) = \sum_{j=C,M,Y} W_j \sum_{i=(in\ the\ C.R.B.)} |S_{ij} - T_{ij}(t)| \qquad (12\text{-}1)$$

If a particular color is important, Wi will be varied so that it is possible to make the particular color relatively more influential. For example, it is considered that a human's eye is sensitive to a G (green) image among R, G, B. In this case, preferably, Wi is set to WG>WR, WB.

Also, if Wi is set to WG=1, WR=WR=0, a calculation amount can be reduced so that it is possible to carry out a high-end process as the gray scale image. Where, an absolute value of a difference between the pixel values is used as an estimate value, a square of the difference may be used as the estimate value.

Further, in case of composing a reduced color image such as an animation image, each pixel value is only respective index for the particular color, it is meaningless whether the value is large or small. Therefore, it is not possible to detect the corresponding point by the formula (10).

Where, the matching of the corresponding point is estimated by the following formula (13).

$$C(t) = \sum_{i=(in\ the\ C.R.B.)} (S_i \# T_i(t)) \qquad (13)$$

Where, "#" is defined as an operator which returns 1 in case of Ai=Bi, and 0 in other cases with Ai#Bi.

In general, since a variable is represented by a binary in a calculator, it is possible to carry out the operation Si#Ti(t) with the bit calculations. Accordingly, it is possible to detect the corresponding point faster than the estimation by the formulas (10), (11), (12) after the image is once converted to RGB image.

As described above, since the pixel value of the reduced image is only the index for the particular color, it is not possible to use a linear interpolation, a spline interpolation, and the likes such as the interpolation for the gray scale image and color image.

Therefore, it is possible to interpolate the reduced color image by using the same technique as the interpolation for the binarized image according to the fifth and eighth embodiments. That is, it is possible to set the pixel value most close to the pixel value position converted by displacement coefficients S, R as the interpolation value.

According to the embodiment as described above, it is possible to provide the image composing apparatus wherein the displacement amount between the images to compose is obtained and interpolated by setting the reference block of the optimal average density or the optimal dispersion value and by detecting the corresponding point on the basis of the movable variable search area and search line having the arbitrary size, thereby the interpolated image can be composed at high speed and with high accuracy.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image composing apparatus for connecting a reference image and an image to compose which are digital images each of which is a different portion of a composite image, with end portions of the digital images having an overlap region in which the image to compose overlaps the reference image for a predetermined width, comprising:

reference block setting means for (i) setting a search area in the reference image within the overlap region, (ii) for setting in the search area a first reference block at a portion having an appropriate dispersion value of pixel values existing in said first reference block, said dispersion value being independent of the image to compose and based only on the reference image, and (iii) for setting a second reference block at a portion of the reference image different from said first reference block in said overlap region and having an appropriate dispersion value which is independent of the image to compose and is based only on the reference image;

means for identifying corresponding pixels in the image to compose which correspond, respectively, to respective predetermined pixels in the first and second reference blocks;

displacement amount detection means for detecting a displacement amount from said each predetermined pixel in each of the first and second reference blocks set by said reference block setting means, to a position of its said respective corresponding pixel in the image to compose when the reference image and image to compose are composed with each other;

interpolation means for interpolating pixels in said image to compose on the basis of the displacement amount detected by said displacement amount detection means to obtain an interpolated image to compose such that an object in the reference image within said overlap region coincides with the same object in the image to compose within said overlap region; and image composing means to derive the composite image by connecting said reference image with said interpolated image to compose.

2. An image composing apparatus according to claim 1, further comprising:

image pick-up means for generating image data items obtained by dividing the composite image into at least two image data items corresponding to the reference image and the image to compose;

quantizing means for quantizing each of the image data items obtained by said image pick-up means;

a first memory for storing quantized image data items; and a second memory for storing the image data items outputted from said image composing means.

3. An image composing apparatus according to claim 2, wherein said image pick-up means generates color image data items (RGB or CMY or CMYK); and said first and second memories store respective color image data items obtained by said image pick-up means.

4. An image composing apparatus according to claim 3, wherein said reference block setting means defines $S_{ij}$ and $\overline{S}_j$ as a pixel value for every color within a suitable reference block and an average value of a pixel value for every color within the suitable reference block, respectively, obtains a dispersion value V of the pixel value in each block of said color image data items by the following formula:

$$V = 1/3N \left( \sum_j \sum_i |S_{ij} - \overline{S}_j| \right)$$

where N is the number of pixels present in a block, $$\sum_i$$

is the sum of all pixels present in a block and $$\sum_j$$

is the sum of pixels of each color, sets a block in such a manner in which the dispersion value V is maximum as the temporary reference block, and sets a block in such a manner in which the dispersion value V of the temporary reference block is more than a threshold obtained by corresponding to the number representative of bit of the image as the reference block.

5. An image composing apparatus according to claim 3, wherein said displacement amount detection means defines $S_{ij}$ and $T_{ij}(t)$ as a pixel value for every color within template block and a pixel value for each color within a block at a position t in the search area, respectively, obtains a value C(t) corresponding to the pixel value in each block of said color image data items by the following formula:

$$C(t) = \sum_j \sum_i |S_{ij} - T_{ij}(t)|$$

where $$\sum_i$$

is the sum of all pixels present in a block, and $$\sum_j$$

is the sum of pixels of each color, and sets a pixel value in such a manner in which the value C(t) is minimum as a corresponding point when the images are composed.

6. An image composing apparatus according to claim 5, wherein said displacement amount detection means defines Wj as a weight for every color, so that the above formula $$C(t) = \sum_j \sum_i |S_{ij} - T_{ij}(t)|$$

is deformed into the following formula $$C(t) = \sum_j Wj \sum_i \Box |S_{ij} - T_{ij}(t)|$$

where $$\sum_i$$

is the sum of all pixels present in a block, and $$\sum_j$$

is the sum of pixels of each color, thereby weighting each color image in accordance with the importance of each color, in order to set said corresponding point.

7. An image composing apparatus according to claim 3, wherein said displacement amount detection means defines "#" as Ai#Bi and uses "#" as an operator for returning 1 in case of Ai=Bi and returning 0 in other cases, and obtains the value C(t) corresponding to the pixel value in each block of said image data items by the following formula:

$$C(t) = \sum_i |S_i \# T_i(t)|$$

where $$\sum_i$$

is the sum of pixels present in a block,
in order to determine the pixel value in such a manner which the value C(t) is minimum as the corresponding point when the images are composed.

8. An image composing apparatus according to claim 2, wherein said reference block setting means defines $S_i$ and $\overline{S}$ as a pixel value within a suitable reference block and an average value of the pixel value within the suitable reference block, respectively, obtains a dispersion value V of the pixel value in each block of said image data items by the following formula:

$$V = 1/N \sum_i (|S_i - \overline{S}|)$$

where N is the number of pixels present in a block, and $$\sum_i$$

is the sum of all pixels present in a block,
sets a block in such a manner in which the dispersion value V is maximum as a temporary reference block, and sets a block in such a manner in which the dispersion value V of the temporary reference block is more than a threshold obtained by corresponding to the number representative of bit of the image as a reference block.

9. An image composing apparatus according to claim 2, wherein said reference block setting means defines $S_i$ and $\overline{S}$ as a pixel value within the suitable reference block and an average value of the pixel value within the suitable reference block, respectively, obtains the dispersion value V of the pixel value in each block of said image data items by the following formula:

$$V = 1/N \left( \sum_i |S_i - \overline{S}| \right)$$

where N is the number of pixels present in a block, and $$\sum_i$$

is the sum of all pixels present in a block,
sets a block in such a manner in which the dispersion value V is maximum as a temporary reference block, and sets a block in such a manner in which the dispersion value V of the temporary reference block is more than a threshold obtained by corresponding to the number representative of bit of the image as the reference block.

10. An image composing apparatus according to claim 2, wherein said displacement amount detection means defines $S_i$ and $T_i$ as a pixel value within template block and each pixel value within a block at a position t in the search area, respectively, obtains a value C(t) corresponding to the pixel value in each block of said image data items by the following formula:

$$C(t) = \sum_i |S_i - T_i(t)|$$

where $$\sum_i$$

is the sum of all pixels present in a block,
and sets a position t in such a manner in which the value C(t) is minimum as a corresponding block relative to the reference block.

11. An image composing apparatus according to claim 1, wherein said interpolation means performs at least one of the following: a binary interpolation, a zero-order interpolation (a close interpolation), a linear interpolation and a spline interpolation.

* * * * *